United States Patent
Chiruvolu et al.

(10) Patent No.: US 7,972,691 B2
(45) Date of Patent: Jul. 5, 2011

(54) COMPOSITES OF POLYMERS AND METAL/METALLOID OXIDE NANOPARTICLES AND METHODS FOR FORMING THESE COMPOSITES

(75) Inventors: Shivkumar Chiruvolu, San Jose, CA (US); Hui Du, Sunnyvale, CA (US); Nobuyuki Kambe, Menlo Park, CA (US)

(73) Assignee: NanoGram Corporation, Milpitas, CA (US)

( * ) Notice: Subject to any disclaimer, the term of this patent is extended or adjusted under 35 U.S.C. 154(b) by 958 days.

(21) Appl. No.: 11/645,084

(22) Filed: Dec. 22, 2006

(65) Prior Publication Data

US 2008/0150184 A1 Jun. 26, 2008

(51) Int. Cl.
B32B 5/16 (2006.01)
H01B 1/00 (2006.01)
(52) U.S. Cl. ......... 428/338; 428/328; 252/500
(58) Field of Classification Search ............... None
See application file for complete search history.

(56) References Cited

U.S. PATENT DOCUMENTS

| | | |
|---|---|---|
| 4,061,503 A | 12/1977 | Berger et al. |
| 4,151,154 A | 4/1979 | Berger |
| 4,680,204 A | 7/1987 | Das et al. |
| 4,828,695 A | 5/1989 | Yamamura et al. |
| 4,842,832 A | 6/1989 | Inoue et al. |
| 4,844,578 A | 7/1989 | Pierini et al. |
| 4,927,464 A | 5/1990 | Cowie |
| 4,955,692 A | 9/1990 | Merlin et al. |
| 4,972,008 A | 11/1990 | Lee et al. |
| 5,049,371 A | 9/1991 | Rinn et al. |
| 5,068,056 A | 11/1991 | Robb |
| 5,075,206 A | 12/1991 | Noda et al. |
| 5,108,201 A | 4/1992 | Matsuura et al. |
| 5,130,362 A | 7/1992 | Psasad et al. |
| 5,270,076 A | 12/1993 | Evers |
| 5,314,947 A | 5/1994 | Sawaragi |
| 5,322,888 A | 6/1994 | Kato et al. |
| 5,372,749 A | 12/1994 | Li et al. |
| 5,443,811 A | 8/1995 | Kavinen |

(Continued)

FOREIGN PATENT DOCUMENTS

EP 0 520 217 B1 12/1992

(Continued)

OTHER PUBLICATIONS

Al-Mawlawi et al., "Electrochemical fabrication of metal and semiconductor nano-wire arrays," in Proc. Symp. Nanostructured Mater. Electrochm., 187th Meeting Electrochem. Soc., Reno, NV, May 21-26, 1995, Electrochem. Soc. 95(8), pp. 262-273, 1995.

(Continued)

*Primary Examiner* — Monique R Jackson
(74) *Attorney, Agent, or Firm* — Dardi & Herbert, PLLC; Peter S. Dardi

(57) ABSTRACT

Successful dispersion approaches are described for the formation of dispersion of dry powders of inorganic particles. In some embodiments, it is desirable to form the dispersion in two processing steps in which the particles are surface modified in the second processing step. Composites can be formed using the well dispersed particles to form improved inorganic particle-polymer composites. These composites are suitable for optical applications and for forming transparent films, which can have a relatively high index or refraction. In some embodiments, water can be used to alter the surface chemistry of metal oxide particles.

20 Claims, 18 Drawing Sheets

U.S. PATENT DOCUMENTS

| | | |
|---|---|---|
| 5,447,708 A | 9/1995 | Helble et al. |
| 5,470,910 A | 11/1995 | Spanhel et al. |
| 5,494,949 A | 2/1996 | Kinkel et al. |
| 5,497,445 A | 3/1996 | Imoto |
| 5,565,041 A | 10/1996 | Hiraoka et al. |
| 5,623,011 A | 4/1997 | Bernard |
| 5,654,090 A | 8/1997 | Kayanoki |
| 5,683,501 A | 11/1997 | Tomihisa et al. |
| 5,698,309 A | 12/1997 | Dallmann et al. |
| 5,777,433 A | 7/1998 | Lester et al. |
| 5,789,326 A | 8/1998 | Hansen et al. |
| 5,807,364 A | 9/1998 | Hansen |
| 5,837,804 A | 11/1998 | Yamagishi et al. |
| 5,840,111 A | 11/1998 | Wiederhoft et al. |
| 5,850,498 A | 12/1998 | Shacklette et al. |
| 5,853,809 A | 12/1998 | Campbell et al. |
| 5,857,039 A | 1/1999 | Bose et al. |
| 5,902,569 A | 5/1999 | Oshima et al. |
| 5,935,890 A | 8/1999 | Mc Laughlin et al. |
| 5,952,125 A | 9/1999 | Bi et al. |
| 5,958,348 A | 9/1999 | Bi et al. |
| 5,965,299 A | 10/1999 | Khan et al. |
| 5,968,652 A | 10/1999 | Hanggi et al. |
| 5,989,111 A | 11/1999 | Lamphere et al. |
| 5,989,514 A | 11/1999 | Bi et al. |
| 5,990,024 A | 11/1999 | Blum et al. |
| 5,997,795 A | 12/1999 | Danforth et al. |
| 6,001,326 A | 12/1999 | Kim et al. |
| 6,002,522 A | 12/1999 | Todori et al. |
| 6,005,707 A | 12/1999 | Berggren et al. |
| 6,026,209 A | 2/2000 | Rhee et al. |
| 6,080,337 A | 6/2000 | Kambe et al. |
| 6,088,492 A | 7/2000 | Kaneko et al. |
| 6,091,537 A | 7/2000 | Sun et al. |
| 6,091,879 A | 7/2000 | Chan et al. |
| 6,106,798 A | 8/2000 | Kambe et al. |
| 6,107,364 A | 8/2000 | Fong et al. |
| 6,136,287 A | 10/2000 | Horne et al. |
| 6,136,891 A | 10/2000 | Chopin et al. |
| 6,136,905 A | 10/2000 | Suzuki et al. |
| 6,139,626 A | 10/2000 | Norris et al. |
| 6,144,795 A | 11/2000 | Dawes et al. |
| 6,193,936 B1 | 2/2001 | Gardner et al. |
| 6,200,674 B1 | 3/2001 | Kumar et al. |
| 6,211,931 B1 | 4/2001 | Fukao et al. |
| 6,225,007 B1 | 5/2001 | Horne et al. |
| 6,229,949 B1 | 5/2001 | Ido et al. |
| 6,236,774 B1 | 5/2001 | Lackritz et al. |
| 6,261,469 B1 | 7/2001 | Zakhidov et al. |
| 6,282,335 B1 | 8/2001 | Lösch et al. |
| 6,311,004 B1 | 10/2001 | Kenney et al. |
| 6,329,058 B1 | 12/2001 | Arney et al. |
| 6,339,030 B1 | 1/2002 | Constant et al. |
| 6,387,531 B1 | 5/2002 | Bi et al. |
| 6,391,494 B2 | 5/2002 | Reitz et al. |
| 6,407,156 B1 | 6/2002 | Hagihara et al. |
| 6,432,526 B1 | 8/2002 | Arney et al. |
| 6,433,931 B1 | 8/2002 | Fink et al. |
| 6,442,321 B1 | 8/2002 | Berini |
| 6,482,374 B1 | 11/2002 | Kumar et al. |
| 6,506,493 B1 | 1/2003 | Kumar et al. |
| 6,593,417 B1 | 7/2003 | Anderson et al. |
| 6,599,631 B2 | 7/2003 | Kambe et al. |
| 6,607,706 B1 | 8/2003 | Kumar et al. |
| 6,692,660 B2 | 2/2004 | Kumar et al. |
| 6,706,795 B1 | 3/2004 | Garti et al. |
| 6,726,990 B1 | 4/2004 | Kumar et al. |
| 6,849,334 B2 | 2/2005 | Horne et al. |
| 6,921,576 B2 * | 7/2005 | Terauchi et al. ............. 428/404 |
| 6,921,788 B1 * | 7/2005 | Izawa et al. ................... 524/430 |
| 6,952,504 B2 | 10/2005 | Bi et al. |
| 7,091,154 B2 * | 8/2006 | Ohmori et al. ................ 502/340 |
| 7,226,966 B2 | 6/2007 | Kambe et al. |
| 7,531,234 B2 * | 5/2009 | Nakamura et al. ............ 428/328 |
| 2002/0192137 A1 | 12/2002 | Chaloner-Gill et al. |
| 2002/0192476 A1 | 12/2002 | Kambe et al. |
| 2003/0096102 A1 | 5/2003 | Yoshihara et al. |
| 2003/0203205 A1 | 10/2003 | Bi et al. |
| 2004/0046501 A1 | 3/2004 | Hayashi |
| 2005/0003220 A1 | 1/2005 | Kitahara et al. |
| 2006/0204745 A1 * | 9/2006 | Jones et al. ................... 428/328 |
| 2007/0003694 A1 | 1/2007 | Chiruvolu et al. |

FOREIGN PATENT DOCUMENTS

| | | |
|---|---|---|
| EP | 0 776 862 A1 | 6/1997 |
| WO | WO 96/28137 A1 | 9/1996 |
| WO | WO 98/35248 A1 | 8/1998 |
| WO | WO 00/04593 A1 | 1/2000 |
| WO | WO 01/32799 A1 | 5/2001 |
| WO | WO 01/81079 A1 | 11/2001 |

OTHER PUBLICATIONS

Al-Mawlawi et al., "Nanowires formed in anodic oxide nanotemplates," J. Materials Research, vol. 9 pp. 1014-1018, Apr. 1994.

Bi et al, "Nanocrystalline α-Fe, $Fe_3C$, and $Fe_7C_3$ produced by $CO_2$ laster pyrolysis," J. Mater. Res. vol. 8, No. 7, pp. 1666-1674, Jul. 1993.

Bi et al., "Synthesis of nanocrystalline Fe-based particles by $CO_2$ laser pyrolysis," Material Research Society Symposium Proceedings, vol. 286, pp. 161-166, 1993.

Cannon et al., "Sinterable Ceramic Particles From Laser-Driven Reactions: II, Powder Characteristics And Process Variables", Journal of the American Ceramic Society, vol. 65, No. 7, pp. 330-335, Jul. 1982.

Encyclopedia of Polymer Science and Engineering, vol. 4, Wiley-Interscience, Edited by Mark et al., pp. 288-289, 1986.

Watanabe et al., "Polymer arrayed-waveguide grating multiplexer with wide tuning range," Electronics Letters, vol. 33, No. 18, pp. 1547-1548, Aug. 28, 1997.

Yang et al., "Hierarchically Ordered Oxides," Science, vol. 282, pp. 2244-2246, Dec. 18, 1998.

Zimmerman et al., "High refractive index films of polymer nanocomposite," J. Mater. Res., vol. 8, No. 7, pp. 1742-1748, Jul. 1993.

* cited by examiner

COMPOSITES OF POLYMERS AND METAL/METALLOID OXIDE NANOPARTICLES AND METHODS FOR FORMING THESE COMPOSITES

FIELD OF THE INVENTION

The invention relates to composite materials comprising a polymer and inorganic particles. More particularly, the invention relates to composites of polymers with surface modified inorganic particles, especially metal/metalloid oxide particles. The invention further relates to method of making composites and to dispersions of inorganic particles in liquids that can be used to form polymer composites or other products.

BACKGROUND OF THE INVENTION

Advances in a variety of fields have created a demand for many types of new materials. In particular, inorganic powders can be used in the production of a range of commercial products including, for example, electronic devices, optical devices and electro-optical devices. Similarly, technological advances have increased the demand for improved material processing with strict tolerances on processing parameters to improve performance of devices while keeping down costs.

As miniaturization continues, material processing similarly falls within stricter tolerances with respect to the dimensions of the structures. Current integrated circuit technology already requires tolerances on processing dimensions on a submicron scale. The consolidation of mechanical, electrical and optical devices into integral components has created further demands on material processing with respect to the different compositions incorporated into a single structure.

Composite materials can be used to combine desirable properties of different individual composition incorporated into the composite as well as to generate new properties that are not achievable from the individual compositions. Thus, a wider range of material properties can be exploited through composites. Alternatively, composite materials can be formed to capture improved or more flexible processing capabilities associated with one material of the composite while capturing some aspect of desirable properties of another component of the composite.

SUMMARY OF THE INVENTION

In a first aspect, the invention pertains to a composite comprising a polymer and surface modified metal oxide particles at a loading of at least 5 weight percent of the composite. In general, the metal oxide particles have a number average primary particle size less than about 20 nanometers and a z-average secondary particle size of no more than about 100 nanometers. The surface modification can comprise a plurality of bonded molecules along the surface of the particles. In some embodiments, the composite formed into a film with a thickness of 5 microns on a transparent substrate has a transmittance at one visible wavelength of at least about 90% relative to the transmittance of the substrate without the composite coating.

In a further aspect, the invention pertains to a method for forming a composite of a polymer and metal oxide particles having an average primary particle size of no more than 100 nm. The method comprises gradually blending a portion of a dispersion comprising surface modified metal oxide particles and a dispersant, into a polymer solution comprising a polymer and a solvent to form a uniform polymer-inorganic particle composite. In some embodiments, the dispersant is miscible with the solvent. The blending generally is performed so that effectively no particles settle from the blend.

In additional aspects, the invention pertains to a method for modifying the surface properties of metal oxide particles having an average primary particle size of no more than 50 nm. The method comprises contacting a dry powder of the metal oxide particles with water to increase the (—OH) content of the particle surfaces, precipitating the particles through the addition of a liquid miscible with water, and dispersing the particles in an alcohol at a concentration of at least about 1 weight percent with a z-average secondary particle size of no more than about 100 nm.

In other embodiments, the invention pertains to a method for producing metal oxide particles in a flow with a surface structure having an enhanced (—OH) contribution. The method comprises exposing a product particle flow with water vapor, and collecting the water modified particles. In some embodiments, the particles are synthesized in the flow from a reactant flow comprising a metal oxide precursor.

DETAILED DESCRIPTION OF THE INVENTION

Figure 1:
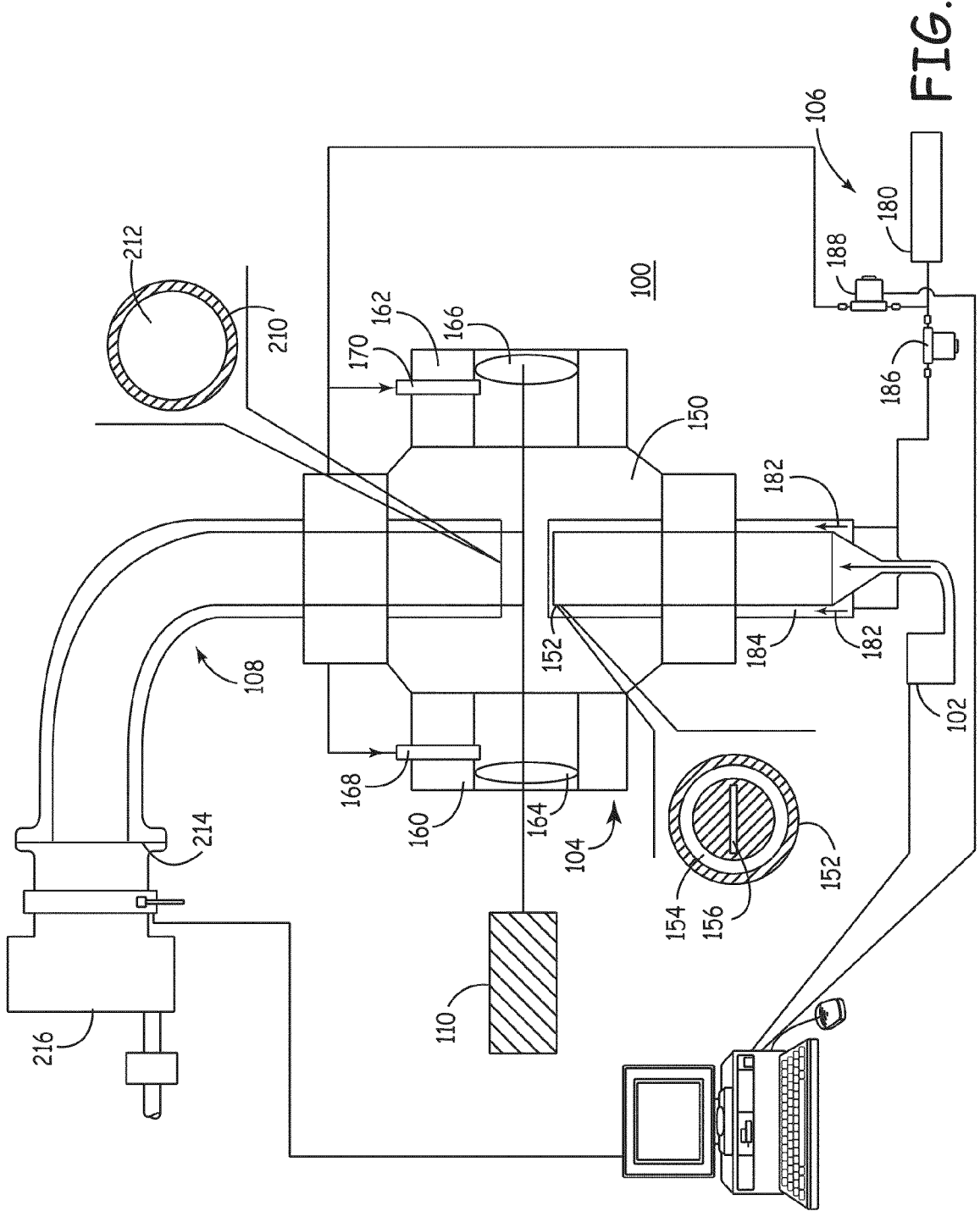
FIG. 1 is a schematic sectional view of a reaction chamber for performing laser pyrolysis synthesis of metal oxide particles.

The effective use of nanoparticles for many applications involves the dispersion of the particles so that agglomerates of the particles are reduced. Improved materials described herein involve well dispersed metal oxide nanoparticles that can be used as dispersions or incorporated into improved polymer composites. In some embodiments, improved surface modification of the particles provides for formation of the improved composites. To form the improved materials, high quality nanoparticles without significant hard fusing are used to form highly dispersed liquid dispersion with small secondary particle sizes. Laser pyrolysis is a desirable approach to form highly uniform and dispersible nanoparticles. The well dispersed nanoparticles in a liquid can be used to form composites with the nanoparticles well dispersed through the composite. The resulting composites can have an improved uniformity that results in correspondingly improved properties of the composites. The composites are particularly desirable for optical applications due to improved optical properties, such as extremely good transparency, due to uniform dispersion and small effective secondary inorganic particle size within the composite. Thus, the composites described herein are particularly effective for use as high index of refraction transparent optical materials.

The concept of particle sizes in the submicron scale is complicated since different measurement approaches yield different information relating to particle size. The concept of primary particle size has evolved since many synthesis approaches yield hard agglomerates that cannot be directly dispersed. Historically, flame pyrolysis has resulted in fused chains of primary particles. However, the primary particles may be visible in micrographs, and the primary particles may correlate significantly with some properties of the material, such as surface area. Also, the irregularity of the fused agglomerates can make it difficult to pack powders at relatively high tap density. Furthermore, due to the hard fusing of the particles, there are limits on the properties achievable with composites formed with these particles.

The term physical particles can be used to refer to the particles in the collection of particles that are not hard fused to each other. Thus, the primary particles differ from the physical particles if the primary particles are hard fused. If the particles are hard fused, a single collection of hard fused primary particles forms a single physical particle. If the primary particles are not hard fused, the physical particles are the same as the primary particles. As described further below, physical particles can generally be discerned from good transmission electron micrographs. For some compositions, grinding with high shear may be able to reduce the physical particle size, for example, by breaking fused bonds between fused primary particles or fracturing primary particles. However, grinding with high shear can lower the crystallinity and otherwise change particle properties in undesirable ways as well as leading to highly non-uniform physical particles. Also, due to heat generated by grinding, there may be a lower limit for many materials on the physical particle size achievable through grinding since the heat from grinding can sinter the particles. For particles formed by laser pyrolysis and other flow based approaches, the physical particles can be approximately equal to the primary particles reflecting that the particles as initially formed in the synthesis do not fuse prior to collection.

Secondary particle size refers to the particle size in a dispersion. Secondary particle size can be measured, for example, using light scattering from a liquid dispersion. The ability of a liquid to disperse particles within the liquid depends on the surface properties of the particles, the nature of the liquid, the concentration of particles and the process used to disperse the particles as well as the physical particle size. Higher concentrations of particles tend to favor agglomeration due to basic thermodynamic principles. However, proper selection of solvent/dispersant properties based on the surface properties of the particles can facilitate better dispersion. Similarly, the application of shear, sound waves and/or other mixing/disruptive forces can facilitate dispersion of the particles. The high quality inorganic particles disclosed herein under appropriate conditions can be dispersed to have secondary particle sizes approximately a few times larger than the primary particle sizes. These excellent dispersion properties can be accomplished at moderately high loadings for dry synthesized metal/metalloid oxide powders, such as up to 5 weight percent inorganic powders or even higher concentrations.

Improved materials can be obtained based on the ability to combine a selected polymer with highly dispersed inorganic particles having selectable compositions and properties achievable through flow-based synthesis approaches. The ability to form good liquid dispersions of the particles facilitates the uniform dispersion of the particles through the polymer composite. A more uniform composite material correspondingly has the behavior as a single material with hybrid properties rather than having the behavior of a blended material with coarsely average properties. With respect to physical properties that have a set distance scale, the uniform composite can have an appearance of a homogenous uniform material. In particular, for example, particles with an average secondary particle size below 50 nm uniformly dispersed in a polymer can have a structure that behaves like a homogenous materials with respect to visible light since the wavelength of light is larger than the inorganic particle size as well as the distance scales of the inhomogeneities. As a result, visible light can have a high transmission through the composite. As disclosed herein, composites can be formed with particle loading, such as greater than about 5 weight percent or greater concentrations.

The improved optical properties of the composites depends on a small average particle size of the particles dispersed in the polymer and on a narrow distribution of particle sizes of the particles dispersed in the polymer. The formation of a good dispersion in the polymer relies on the proper surface modification of the inorganic particles, which makes the inorganic particles compatible with the particle matrix and helps to prevent agglomeration of the particles within the polymer. Obtaining good surface modification of the particles depends on obtaining well dispersed particles of the unmodified particles in a dispersant with a low amount of agglomeration, so that molecules of the surface modification agent can coat more of the surfaces of the particles that are not sterically blocked due to agglomeration. After the particles are surface modified, the particles are suspended in a solvent that is compatible with the polymer or monomer to be incorporated into the composite, and this solvent can be, but does not need to be an optimal dispersant for the surface modified particles since the liquid just carries the particles for blending into the polymer. As long as the dispersant for the surface modified particles has good compatibility with the polymer, improved composites can be formed once the liquid is removed.

The inorganic particles may or may not be surface modified for incorporation into a polymer composite. A surface modifying agent may or may not chemically bond with the inorganic particle. If the surface modification agent does not chemically bond with the particles, this composition may associate with the surface due to non-specific interactions and/or entropic effects. Similarly, the polymer may or may not be chemically bonded to the inorganic particles. If the polymer is chemically bonded to the inorganic particles, the polymer can be directly bonded to the particle surface or indirectly bonded through a bond to a surface modifying composition that is chemically bonded to the particle surface. In a structure with the polymer bonded to the inorganic particles is formed, it may be arbitrary to distinguish a linking composition that originated as a surface modifying composition, but the surface modifying composition can have an identifiable presence due to the resulting functional groups formed from the synthetic reactions. As used herein, chemical bonding refers to bonds with some covalent character, which can include, for example, bonds found in organic compositions, metal-ligand bonds and the like.

Certain functional groups have the ability to form chemical bonds with inorganic particles. These functional groups can form the basis for bonding surface modification agents and/or polymers to the inorganic particle surfaces. Bonding to polymers can take place through polymer terminal groups and/or through polymer side chains. The bonding of polymers directly or indirectly with nanoparticles is discussed further in U.S. Pat. No. 6,599,631 to Kambe et al., entitled "Polymer-Inorganic Particle Composites," incorporated herein by reference. Whether or not a surface modification composition is chemically bonded to the inorganic particle, the polymer can be chemically bonded to the surface modification agent.

A wide range of polymers can be used individually or in combination to form the composites described herein. In particular, organic polymers and silicon-based polymer, such as polysiloxanes, are suitable for formation of the composites. In some embodiments, the polymer is selected or modified to have particular functional groups that are suitable for bonding to surface modification agents or to inorganic particles. In general, the polymer is selected to impart desired properties to the resulting composites. The polymers may or may not be crosslinked within the final composite.

In general, desirable particles for the composites are submicron, i.e., the particle collections have an average primary particle diameter of no more than about 1 micron, which is equal to 1000 nanometers (nm), and for optical applications generally no more than about 100 nm. In some embodiments, the particles are very uniform in particle size such that the particle collections have corresponding uniformity of properties. In some embodiments, the composites comprises a mixture of inorganic particles that can be selected to contribute different properties to the ultimate composite. Suitable nanoparticles can be formed, for example, by vapor-based flow processes, such as flame pyrolysis, combustion, or solution-based approaches, such as sol gel approaches.

Vapor-based particle production techniques in a flow are desirable due to their flexibility with respect to product particle composition, ability to form highly crystalline particle either directly or with mild additional processing and a wide range of ability to introduce dopants. However, the resulting dry powders of particles are more difficult to process. In particular, these particles are more difficult to disperse in a liquid. In contrast, solution-based synthesis approaches can form particles that are inherently more dispersible, but the particles can have less desirable properties due to decreased levels of crystallinity, limited compound selection and difficulties in selecting among different crystal structures.

As described herein, improved approaches are found to disperse dry nanoparticle powders, perform surface modification of the particles in a dispersion and to form composites. Using one or more of the improved processing approaches described herein, composites can be formed with significantly improved optical properties as well as high particle loadings with extremely good dispersion of the particles through the composite. Thus, the advantages of vapor-based particle synthesis can be combined with desirable solution based processing approaches with highly dispersed particles to obtain improved composites with properties that were previously unachievable.

In some embodiments of particular interest, the particles are synthesized by laser pyrolysis in which light from an intense light source drives the reaction to form the particles. Laser pyrolysis is a particularly versatile vapor-based particle synthesis approach. Laser pyrolysis is useful in the formation of particles that are highly uniform in composition, crystallinity and size.

Laser pyrolysis has been successfully used for the synthesis of a wide range of complex inorganic particles, including, for example, compositions with multiple metal/metalloid elements as well as doped materials. For example, phosphor particles with desirable properties have been produced. See, for example, U.S. Pat. No. 6,692,660 to Kumar, entitled High Luminescent Phosphor Particles and Related Particle Compositions," incorporated herein by reference. Also, high quality rutile titanium oxide particles are suitable for forming composites with a high index of refraction. The formation of rutile titanium dioxide is described further in U.S. Pat. No. 6,599,631 to Kambe et al., entitled Polymer Inorganic Particle Composites," incorporated herein by reference. Other desirable inorganic particles formed by laser pyrolysis are described below.

The inorganic particles comprise metal elements and/or metalloid elements in their elemental form or in compounds. Specifically, the inorganic particles can comprise, for example, elemental metal or elemental metalloid, i.e. un-ionized elements, metal/metalloid oxides, metal/metalloid nitrides, metal/metalloid carbides, metal/metalloid sulfides or combinations thereof. Metal/metalloid oxide compounds are of particular interest for the composites described herein. Metalloids are elements that exhibit chemical properties intermediate between or inclusive of metals and nonmetals. Metalloid elements include silicon, boron, arsenic, antimony, and tellurium.

For crystalline particles, the surface of the particle represents an abrupt termination of the crystal structure. The surface chemistry of the particles and the structure of the crystal at its surface are correlated with each other. Conceptually, simply ending the crystal structure abruptly results in free radicals or similar unstable structures due to dangling bonds. While some radicals can be stable, generally the particle surface rearranges to form chemically stable species which can have surface stain and alteration of the crystal structure near the surface.

For metal oxide particles, the structure along the particle surface can have bridging oxygen atoms (—O—) or double bonded oxygen atoms (═O) to terminate the crystal structure with appropriate chemical stability. However, these structures tend to introduce a strained surface but a relatively inert surface. Alternatively or additionally, the presence of single valent atoms, such as H or a halogen, can terminate the crystal structure with stable groups, such as M-Cl or M-O—H, where M is a metal atom of the crystal. Truncation of the crystal lattice at mono-valent atoms can reduce surface strain, result in less crystal restructuring near the particle surface and provide surface groups for later surface modification.

It has been discovered that contact of particles formed by laser pyrolysis with water can modify the surface chemistry. While not wanting to be limited by theory, this surface modification may be the result of the water displacing $Cl^{1-}$ ions or other reactive groups from the particle surface and replacing these with (—OH) group. It has been found that this treatment with water improves dispersion of the particles in alcohols and also improves the surface modification of the particles with alkoxysilanes. Particles formed with other flow based techniques with chlorine atoms bonded at the surface would be expected to be similarly modified with water. The water treatment can be performed in-flight or with a separate water contact with the as-formed particles.

Compositions for surface modification of the inorganic particles can be selected by their ability to associate with the surface of particular inorganic particles. The surface modification composition generally can have no reactive functional groups, one reactive functional group, two reactive functional groups or more than two reactive functional groups. The number of reactive functional groups generally is consistent with the desired chemical bonding of the surface modification agent with respect to the particle surface and/or the polymer, although functional groups can also contribute to non-bonding interactions with the particles as well as to altering interactions with the solvent/dispersant.

Alkoxysilanes have been known for some time to chemically bond with the surface of metal oxide particles. The alkoxy-groups hydrolyze to form the corresponding alcohol with a silane bonded to the particle through an oxygen group, i.e. "particle-O-silane." The resulting group can be referred to for convenience as an oxysilane group, although it is arbitrary whether or not to consider the oxygen atom of the group to be part of the particle or part of the silane group. In general, trialkoxysilanes are used since the hydrolysis of the three alkoxy groups can result in a very stable surface modifying group bonded to the particle surface at three points.

In general, the processes described herein relate to the formation of liquid dispersions starting with a dry metal oxide without surface modification. The metal/metalloid oxide powder can be formed from a vapor-based flow synthesis method although other processes can be used, such as solution based processes. While powders formed in solution can be more conveniently surface modified before harvesting the particles from the solution after they are synthesized, it may be desirable to thermally process the particles as an unmodified dry powder to alter or improve the properties of the particles in a way inconsistent with a surface modification. Thus, a dry powder of a metal/metalloid oxide without surface modification can be formed by solution based methods such as sol gel. However, unmodified particles formed by solution based approaches tend to form hard agglomerates upon harvesting and/or further processing presumably due to the surface chemistry of these materials.

With respect to dispersions, in some embodiments the ultimate objective generally involves the formation of a dispersion of particles with a surface modifier. These dispersions with surface modified particles can be formed as stable dispersion at higher particles concentrations than dispersions with particles that are not surface modified. However, it has been found that this dispersion process is better performed with at least two steps in the process. Specifically, the particles without surface modification are well dispersed in a liquid, which may or may not have non-bonding surface active agents. Then, this dispersion with well dispersed unmodified particles is contacted with a surface modification compound. This second step may or may not involve a change of solvent/dispersant liquid.

Generally, the ability to disperse the unmodified particles is significantly dependent on the selection of dispersant. If the dry powders of unmodified inorganic particles can be well dispersed in a liquid and the surface modifying compound is soluble in the same liquid, then the surface modifying compound can be added to the well dispersed unmodified particles. However, the objective is to have a versatile processing approach with options for producing a wide range of materials. If the surface modifying compound is not soluble in a liquid that is a suitable dispersant for the particles, the surface modifying compound can be dissolved into a liquid that is miscible with the dispersant for the particles. Thus, when the surface modifying solution is mixed with the particle dispersion, the surface modifying compound can effectively contact the particle surfaces. In this way, very well dispersed particles can be achieved with a broader range of surface modifying agents. In addition, the second liquid helps to stabilize the dispersion of the surface modified particles once they are formed. Since the particles are well dispersed prior to surface modification, correspondingly well dispersed surface modified particles can be obtained with little or no agglomeration.

In general, the surface modified particles can be well dispersed at higher concentrations than the unmodified particles. To achieve the higher concentrations once the surface modification is performed, the solvent can be evaporated from the dispersion. However, even if the evaporated solvent is recycled, evaporating the solvent can consume significant amounts of energy. Therefore, it can be desirable to precipitate the surface modified particles. The particles can be precipitated by adding a miscible liquid to form a liquid blend in which the particles do not remain dispersed. Once the particles settle from the liquid, the liquid can be decanted off The surface modified particles generally are significantly easier to re-suspend than the original unmodified powders as long as they do not dry. The surface modified particles can be re-suspended at the desired concentrations.

It has been found that metal oxide particles produced by flow-based synthesis approaches can be well dispersed at moderate concentrations in unmodified form in alcohols, such as methanol or propylene glycol. The as-synthesized particles can be stably dispersed in water at moderate concentrations, although the average secondary particle size generally is larger than in dispersions in certain alcohols. Also, it has been discovered that the contact of the particles with water also can increase the presence of —OH groups on the surface of the particles. The increased presence of —OH groups improves the subsequent dispersion of the particles in alcohols and provides additional functional groups for bonding with surface modification agents, such as alkoxysilanes. Thus, the initial contact of the inorganic particles with water and the subsequent dispersion in a suitable alcohol results in a surprisingly improved dispersion in the alcohol. Improved dispersions are stable with a relatively smaller average secondary particle size at a particular concentration.

As an alternative to the post-formation treatment with water, the particles can be contacted with water in-flight, following synthesis of the particles but prior to collection of the particles. The water can be introduced for example, as an aerosol into the product flow either downstream from the reaction zone within the reaction chamber and/or within the conduit of the collection system. The water can be introduced using appropriate inlets. In-flight modification of inorganic particles formed by laser pyrolysis or other reactive flows, such as a flame synthesis approach, is described further in copending U.S. patent application Ser. No. 11/438,477, filed May 22, 2006 to Chiruvolu et al., entitled "In-Flight Modification of Inorganic Particles Within a Reaction Product Flow," incorporated herein by reference.

The well dispersed particles can be delivered as a dispersion for a range of applications. The particles can be delivered with or without surface modification. In some embodiments, it is desirable to ship the surface modified particles since the dispersions are generally more stable and since the concentrations are generally higher. Shipping costs are significantly lower if the dispersions are correspondingly more concentrated, and shelf life is higher if the dispersions are more stable. The dispersion can be used to deliver the particles to a range of structures. The dispersions can be delivered using a range of delivery approaches, such as spray coatings, spin coating, printing and the like. However, in some applications, the dispersions are used to form composite materials that are formed in solution prior to further processing into structures for devices.

While in principle, the incorporation of well dispersed particles into a polymer composite seems straightforward, but it can be complex to properly disperse the particles uniformly through the composite material. A first complication is that the solvent suitable for the polymer may not be suitable for the particle dispersion. The particle dispersions generally are very sensitive to the liquid properties. A second complication is that the particles tend to clump in the composite even if the particles are well dispersed prior to forming the composite. If an inorganic particle surface modifier is properly selected, the polymer interacts in a stable way with the modified particles so that the particles if well dispersed in the polymer remain well dispersed. In particular, the surface modified particles tend to form stable formations with the polymer whether or not the particles chemically bond with the polymer. However, if the particles get significantly agglomerated, the can be difficult subsequently to disperse the particles uniformly in the polymer.

Also, the polymer molecules can have a structure in solution that can discourage incorporation of the particles into a uniform structure. For example, the polymer molecules can fold to form nanoscale polymer particles within the solution. The folding of the polymer molecules within the solution can further discourage uniform blending of the particles within the composite since only the surface of the polymer particle may be exposed. Selection of a solvent to denature tertiary structure of the polymer molecules can encourage formation of a uniform composite. The molecular weight distribution of the polymer and the concentration of the polymer determine the viscosity of the polymer solution in a selected solvent. A lower viscosity improves the mixing with inorganic particle dispersions. For a fixed molecular weight, the solvent and concentration can be adjusted to provide a viscosity in a desired range. The mixing conditions should be selected to provide an appropriate amount of time and an environment during the mixing process for macromolecules to re-configure and for particles to incorporate into the polymer macromolecules.

These problems can be significantly overcome through the gradual addition of the particle dispersion to a solution of the polymer while mixing the polymer solution. The drop-wise or other gradual addition of the particle dispersion leaves a low concentration of particles within the combined solution in which the particles are not yet associated with the polymer. As inorganic particles are associated with the polymer, these particles are generally not available to form agglomerates with other inorganic particles. Thus, through the gradual addition of the particle dispersion with the polymer solution, the particles can be very uniformly distributed through the composite so that on smaller distance scales the material has the appearance of a uniform material.

In some embodiments, the dispersed particles can be blended with monomers or oligomers in a solvent prior to polymerization. To get good blending, gradual addition can also be used. The polymerization can be initiated during the addition of the particle dispersion or after the particles are blended with the polymer precursors. Polymerization or crosslinking can be initiated through the addition of a reactant, such as a radical initiator, a catalyst, radiation, combinations thereof or the like.

Solvent stability issues arise with the addition of the particles to a polymer or polymer precursor solution that are similar to issues encountered with mixing a surface modification compound with the inorganic particle dispersion. In particular, the dispersant used for the particles should be miscible with the solvent for the polymer or the polymer precursor. Proper selection of the solvent reduces agglomeration when the particles are added to the polymer materials. This selection of dispersant improves dispersion of the particle through the solvent even for embodiments in which the particles are added gradually to the polymer solution.

The composite materials with improved uniformity described herein provide for significantly improved optical properties. In particular, since the materials can be significantly more uniform on a distance scale of visible and infrared, the composite is significantly more transparent to light with the appropriate wavelength. While not wanted to be limited by theory, one can imagine that increased scattering of less uniform composites results from clustering of the particles or similarly by microscopic index of refraction variations that are roughly on the order of magnitude of distances of the wavelength of light. Nevertheless, the improved uniformity of the composite achieved herein provides for a transmittance of visible light greater than 90 percent relative to the transmittance through a corresponding structure formed with the polymer without the particles.

Other optical properties of the composite can be similarly improved. For example, the formation of composites with phosphor particles can result in improved luminescence of the composites due to the improved uniformity of the materials. Other functional optical materials similarly have improved performance due to the improved uniformity of the composite.

Composition of Inorganic Particles

In general, inorganic particles with any stable composition can be used to form the composites. In some embodiments, the particles have an average diameter of no more than about one micron, and in further embodiments it is desirable to have particles with smaller particle sizes to introduce desired properties for resulting materials. The composition of the particles generally is selected to impart desired properties to the composite. Thus, in the formation of optical material, for example, the optical properties of the inorganic particles can be selected to form a composite material with the desired optical properties, such as index of refraction, emission and/or transparency.

Small and uniform inorganic particles can provide processing advantages with respect to forming uniform composite materials. In addition, small inorganic particles have desirable properties for optical applications including, for example, a shifted absorption spectrum toward the ultraviolet and reduced scattering of visible light. Suitable nanoparticles can be formed, for example, by laser pyrolysis, flame synthesis, combustion, or solution-based processes, such as sol gel approaches. In particular, laser pyrolysis is useful in the formation of particles that are highly uniform in composition, crystallinity and size. Laser pyrolysis involves light from an intense light source that drives the reaction to form the particles. Laser pyrolysis is an excellent approach for efficiently producing a wide range of nanoscale particles with a selected composition and a narrow distribution of average particle diameters. Alternatively, submicron particles can be produced using a flame production apparatus such as the apparatus described in U.S. Pat. No. 5,447,708 to Helble et al., entitled "Apparatus for Producing Nanoscale Ceramic Particles," incorporated herein by reference. Furthermore, submicron particles can be produced with a thermal reaction chamber such as the apparatus described in U.S. Pat. No. 4,842,832 to Inoue et al., "Ultrafine Spherical Particles of Metal Oxide and a Method for the Production Thereof," incorporated herein by reference.

For convenience, light-based pyrolysis is referred to as laser pyrolysis since this terminology reflects the convenience of lasers as a radiation source and is a conventional term in the art. Laser pyrolysis approaches discussed herein incorporate a reactant flow that can involve gases, vapors, aerosols or combinations thereof to introduce desired elements into the flow stream. The versatility of generating a reactant stream with gases, vapor and/or aerosol precursors provides for the generation of particles with a wide range of potential compositions.

A collection of submicron/nanoscale particles may have an average diameter for the primary particles of less than about 500 nm, in some embodiments from about 2 nm to about 100 nm, alternatively from about 2 nm to about 75 nm, or from about 2 nm to about 50 nm. A person of ordinary skill in the art will recognize that other ranges within these specific ranges are covered by the disclosure herein. Primary particle diameters are evaluated by transmission electron microscopy.

As used herein, the term "particles" refer to physical particles, which are unfused, so that any fused primary particles are considered as an aggregate, i.e. a physical particle. For particles formed by laser pyrolysis, the particles can be generally effectively the same as the primary particles, i.e., the primary structural element within the material. If there is hard fusing of some primary particles, these hard fused primary particles form correspondingly larger physical particles. The primary particles can have a roughly spherical gross appearance, or they can have rod shapes, plate shapes or other non-spherical shapes. Upon closer examination, crystalline particles generally have facets corresponding to the underlying crystal lattice. Amorphous particles generally have a spherical aspect. Diameter measurements on particles with asymmetries are based on an average of length measurements along the principle axes of the particle.

Because of their small size, the particles tend to form loose agglomerates due to van der Waals and other electromagnetic forces between nearby particles. These loose agglomerates can be dispersed in a dispersant to a significant degree, and in some embodiments approximately completely to form dispersed primary particles. The size of the dispersed particles can be referred to as the secondary particle size. The primary particle size, of course, is the lower limit of the secondary particle size for a particular collection of particles, so that the average secondary particle size can be approximately the average primary particle size if the primary particles are substantially unfused and if the particles are effectively completely dispersed in the liquid.

The secondary or agglomerated particle size may depend on the subsequent processing of the particles following their initial formation and the composition and structure of the particles. In particular, the particle surface chemistry, properties of the dispersant, the application of disruptive forces, such as shear or sonic forces, and the like can influence the efficiency of fully dispersing the particles. In some embodiments, the secondary particles have an average diameter no more than about 1000 nm, in additional embodiments no more than about 500 nm, in further embodiments from about 2 nm to about 300 nm, in other embodiments about 2 nm to about 100 nm, and alternatively about 2 nm to about 50 nm. A person of ordinary skill in the art will recognize that other ranges within these specific ranges are contemplated and are within the present disclosure.

Secondary particles sizes within a liquid dispersion can be measured by established approaches, such as dynamic light scattering. Suitable particle size analyzers include, for example, a Microtrac UPA instrument from Honeywell based on dynamic light scattering, a Horiba Particle Size Analyzer from Horiba, Japan and ZetaSizer Series of instruments from Malvern based on Photon Correlation Spectroscopy. The principles of dynamic light scattering for particle size measurements in liquids are well established.

Even though the particles may form loose agglomerates, the nanometer scale of the particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material. For example, the absorption spectrum of crystalline, nanoscale $TiO_2$ particles is shifted into the ultraviolet.

The particles can have a high degree of uniformity in size. Laser pyrolysis generally results in particles having a very narrow range of particle diameters. Furthermore, heat processing under suitably mild conditions generally does not significantly alter the very narrow range of particle diameters. With aerosol delivery of reactants for laser pyrolysis, the distribution of particle diameters is particularly sensitive to the reaction conditions. Nevertheless, if the reaction conditions are properly controlled, a very narrow distribution of particle diameters can be obtained with an aerosol delivery system. As determined from examination of transmission electron micrographs, the particles generally have a distribution in sizes such that at least about 95 percent, and in some embodiments 99 percent, of the particles have a diameter greater than about 35 percent of the average diameter and less than about 220 percent of the average diameter. In additional embodiments, the particles generally have a distribution in sizes such that at least about 95 percent, and in some embodiments 99 percent, of the particles have a diameter greater than about 40 percent of the average diameter and less than about 160 percent of the average diameter. In embodiments of particular interest, the particles have a distribution of diameters such that at least about 95 percent, and in some embodiments 99 percent, of the particles have a diameter greater than about 60 percent of the average diameter and less than about 140 percent of the average diameter. A person of ordinary skill in the art will recognize that other ranges of uniformity within these specific ranges are covered by the disclosure herein.

Furthermore, in some embodiments essentially no particles have an average diameter greater than about 5 times the average diameter, in other embodiments about 4 times the average diameter, in further embodiments 3 times the average diameter, and in additional embodiments 2 times the average diameter. In other words, the particle size distribution effectively does not have a tail indicative of a small number of particles with significantly larger sizes. This is a result of the small reaction region to form the inorganic particles and corresponding rapid quench of the inorganic particles. An effective cut off in the tail of the size distribution indicates that there are less than about 1 particle in $10^6$ have a diameter greater than a specified cut off value above the average diameter. High particle uniformity can be exploited in a variety of applications.

In addition, the nanoparticles for incorporation into the composite particles may have a very high purity level. Furthermore, crystalline nanoparticles, such as those produced by laser pyrolysis, can have a high degree of crystallinity. Similarly, the crystalline nanoparticles produced by laser pyrolysis can be subsequently heat processed to improve and/or modify the degree of crystallinity and/or the particular crystal structure. Impurities on the surface of the particles may be removed by heating the particles to achieve not only high crystalline purity but high purity overall.

A basic feature of successful application of laser pyrolysis for the production of desirable inorganic nanoparticles is the generation of a reactant stream containing one or more metal/metalloid precursor compounds, a radiation absorber and, in some embodiments, a secondary reactant. The secondary reactant can be a source of non-metal/metalloid atoms, such as oxygen, required for the desired product and/or can be an oxidizing or reducing agent to drive a desired product formation. A secondary reactant may not be used if the precursor decomposes to the desired product under intense light radiation. Similarly, a separate radiation absorber may not be used if the metal/metalloid precursor and/or the secondary reactant absorb the appropriate light radiation to drive the reaction. The reaction of the reactant stream is driven by an intense radiation beam, such as a light beam, e.g., a laser beam. In some embodiments, $CO_2$ lasers can be effectively used. As the reactant stream leaves the radiation beam, the inorganic particles are rapidly quenched with particles in present in the resulting product particle stream, which is a continuation of the reactant stream. The concept of a stream has its conventional meaning of a flow originating from one location and ending at another location with movement of mass between the two points, as distinguished from movement in a mixing configuration.

A laser pyrolysis apparatus suitable for the production of commercial quantities of particles by laser pyrolysis has been developed using a reactant inlet that is significantly elongated in a direction along the path of the laser beam. This high capacity laser pyrolysis apparatus, e.g., 1 kilogram or more per hour, is described in U.S. Pat. No. 5,958,348, entitled "Efficient Production Of Particles By Chemical Reaction," incorporated herein by reference. Approaches for the delivery of aerosol precursors for commercial production of particles by laser pyrolysis is described in copending and commonly assigned U.S. Pat. No. 6,193,936 to Gardner et al., entitled "Reactant Delivery Apparatus," incorporated herein by reference.

In general, nanoparticles produced by laser pyrolysis can be subjected to additional processing to alter the nature of the particles, such as the composition and/or the crystallinity. For example, the nanoparticles can be subjected to heat processing in a gas atmosphere prior to use. Under suitably mild conditions, heat processing is effective to modify the characteristics of the particles without destroying the nanoscale size or the narrow particle size distribution of the initial particles. For example, heat processing of submicron vanadium oxide particles is described in U.S. Pat. No. 5,989,514 to Bi et al., entitled, "Processing Of Vanadium Oxide Particles With Heat," incorporated herein by reference.

A wide range of simple and complex submicron and/or nanoscale particles have been produced by laser pyrolysis with or without additional heat processing. In general, the inorganic particles generally include metal or metalloid elements in their elemental form or in compounds. Specifically, the inorganic particles can include, for example, elemental metal or elemental metalloid, i.e. un-ionized elements such as silver or silicon, metal/metalloid oxides, metal/metalloid nitrides, metal/metalloid carbides, metal/metalloid sulfides or combinations thereof In addition, there is the capability for producing nano-particulate carbon materials. Particles comprising complex ternary and quaternary compounds have also been made. In addition, uniformity of these high quality materials can be substantial. These particles generally can have a very narrow particle size distribution. Availability of a wide range of compositions and crystal structures of nanoparticles provides a corresponding significant range in potential combinations between nanoparticles and polymers as well as properties for the resulting composites.

With respect to the electrical properties of the particles, some particles include compositions such that the particles are electrical conductors, electrical insulators or electrical semiconductors. Suitable electrical conductors include, for example, elemental metals and some metal compositions. Electrical conductors, such as metals, generally have a room temperature resistivity of no more than about $1 \times 10^{-3}$ Ohm-cm. Electrical insulators generally have a room temperature resistivity of at least about $1 \times 10^5$ Ohm-cm. Electrical semiconductors include, for example, silicon, GaN, CdS and InP. Semiconducting crystals can be classified to include so called, II-VI compounds, III-V compounds and group IV compounds, where the number refers to the group in the periodic table. Semiconductors are characterized by a large increase in conductivity with temperature in pure form and an increase in electrical conductivity by orders of magnitude upon doping with electrically active impurities. Semiconductors generally have a band gap that results in the observed conductivity behavior. At room temperature, the conductivity of a semiconductor is generally between that of a metal and a good electrical insulator.

Several different types of nanoscale particles have been produced by laser pyrolysis. Selected inorganic particles can generally be characterized as comprising a composition with a number of different elements that are present in varying relative proportions, where the number and the relative proportions are selected based on the application for the nanoscale particles. Materials that have been produced (possibly with additional processing, such as a heat treatment) or have been described in detail for production by laser pyrolysis include, for example, carbon particles, silicon, $SiO_2$, doped $SiO_2$, titanium oxide (anatase and rutile $TiO_2$), MnO, $Mn_2O_3$, $Mn_3O_4$, $Mn_5O_8$, vanadium oxide, silver vanadium oxide, lithium manganese oxide, aluminum oxide ($\gamma$-$Al_2O_3$, delta-$Al_2O_3$ and theta-$Al_2O_3$), doped-aluminum oxide (alumina), tin oxide, zinc oxide, rare earth metal oxide particles, rare earth doped metal/metalloid nitride particles, rare earth metal/metalloid sulfides, rare earth doped metal/metalloid sulfides, silver metal, iron, iron oxide, iron carbide, iron sulfide ($Fe_{1-x}S$), cerium oxide, zirconium oxide, barium titanate ($BaTiO_3$), aluminum silicate, aluminum titanate, silicon carbide, silicon nitride, and metal/metalloid compounds with complex anions, for example, phosphates, silicates and sulfates. The production of a range of particles by laser pyrolysis is described further in published U.S. Patent Application 2003/203205A to Bi et al., entitled "Nanoparticle Production and Corresponding Structures," incorporated herein by reference.

Submicron and nanoscale particles can be produced with selected dopants using laser pyrolysis and other flowing reactor systems. Amorphous powders and crystalline powders can be formed with complex compositions comprising a plurality of selected dopants. The powders can be used to form optical materials and the like. Amorphous submicron and nanoscale powders and glass layers with dopants, such as rare earth dopants and/or other metal dopants, are described further in U.S. Pat. No. 6,849,334 to Home et al., entitled "Optical Materials And Optical Devices," incorporated herein by reference. Crystalline submicron and nanoscale particles with dopants, such as rare earth dopants, are described further in U.S. Pat. No. 6,692,660 to Kumar et al., entitled "High Luminescence Phosphor Particles," incorporated herein by reference.

The dopants can be introduced at desired quantities by varying the composition of the reactant stream. The dopants are introduced into an appropriate host material by appropriately selecting the composition in the reactant stream and the processing conditions. Thus, submicron particles incorporating one or more metal or metalloid elements as host composition with selected dopants, including, for example, rare earth dopants and/or complex blends of dopant compositions, can be formed. For embodiments in which the host materials are oxides, an oxygen source should also be present in the reactant stream. For these embodiments, the conditions in the reactor should be sufficiently oxidizing to produce the oxide materials.

Furthermore, dopants can be introduced to vary properties of the resulting particles. For example, dopants can be introduced to change the optical properties of the particles that are subsequently incorporated into polymer-inorganic particle composite particles. For optical applications, the index-of-refraction can be varied to form specific optical devices that operate with light of a selected frequency range or dopants can introduce fluorescent or phosphorescent properties to the particles such that they can function as phosphors. Dopants can also be introduced to alter the processing properties of the material. Furthermore, dopants can also interact within the materials. For example, some dopants are introduced to increase the solubility of other dopants.

In some embodiments, the one or plurality of dopants are rare earth metals or rare earth metals with one or more other dopant elements. Rare earth metals comprise the transition metals of the group IIIb of the periodic table. Specifically, the rare earth elements comprise Sc, Y and the Lanthanide series. Other suitable dopants comprise elements of the actinide series. For optical glasses, the rare earth metals of particular interest as dopants comprise, for example, Ho, Eu, Ce, Th, Dy, Er, Yb, Nd, La, Y, Pr and Tm. Generally, the rare earth ions of interest have a +3 ionization state, although $Eu^{+2}$ and $Ce^{+4}$ are also of interest. Rare earth dopants can influence the optical absorption properties that can enable the application of the materials for the production of optical amplifiers and other optical devices. Suitable non-rare earth dopants for various purposes include, for example, Bi, Sb, Zr, Pb, Li, Na, K, Ba, B, Si, Ge, W, Ca, Cr, Ga, Al, Mg, Sr, Zn, Ti, Ta, Nb, Mo, Th, Cd and Sn.

As noted above, laser pyrolysis has been used to produce a range of powder compositions. The compositions can include multiple metal/metalloid elements. A representative sample of references relating to some of these powder materials is presented in the following.

As a first example of nanoparticle production, the production of silicon oxide nanoparticles is described in U.S. Pat. No. 6,726,990 to Kumar et al., entitled "Silicon Oxide Particles," incorporated herein by reference. This patent application describes the production of amorphous $SiO_2$. The synthesis by laser pyrolysis of silicon carbide and silicon nitride is described in copending and commonly assigned U.S. patent application Ser. No. 09/433,202 to Reitz et al. filed on Nov. 5, 1999, entitled "Particle Dispersions," incorporated herein by reference. The production of silicon particles by laser pyrolysis is described in an article by Cannon et al., J. of the American Ceramic Society, Vol. 65, No. 7, pp. 330-335 (1982), entitled Sinterable Ceramic Particles From Laser-Driven Reactions: II, Powder Characteristics And Process Variables," incorporated herein by reference.

The production of titanium oxide nanoparticles and crystalline silicon dioxide nanoparticles is described in U.S. Pat. No. 6,387,531 to Bi et al., entitled "Metal (Silicon) Oxide/Carbon Composites," incorporated herein by reference. In particular, this application describes the production of anatase and rutile $TiO_2$. The production of aluminum oxide nanoparticles is described in copending and commonly assigned, U.S. patent application Ser. No. 09/136,483 to Kumar et al., entitled "Aluminum Oxide Particles," incorporated herein by reference.

Furthermore, mixed metal oxide nanoparticles have been produced by laser pyrolysis along with or without subsequent heat processing, as described in U.S. Pat. No. 6,607,706 to Kumar et al., entitled "Composite Metal Oxide Particles," and U.S. Pat. No. 6,482,374 to Kumar et al., entitled "Reaction Methods for Producing Lithium Metal Oxide Particles," and U.S. Pat. No. 6,136,287 to Home et al., entitled "Lithium Manganese Oxides and Batteries," all three of which are incorporated herein by reference. The formation of submicron and nanoscale particles comprising metal/metalloid compounds with complex anions is described in copending and commonly assigned U.S. patent application Ser. No. 09/845,985 to Chaloner-Gill et al., entitled "Phosphate Powder Compositions And Methods For Forming Particles With Complex Anions," incorporated herein by reference. Suitable complex anions include, for example, phosphates, silicates and sulfates.

Dispersion of Inorganic Particles

The dispersion of inorganic particles formed as a dry powder depends on several important factors. One important factor is the surface chemistry of the particles as well as the technique to form the particles. Also, the nature of the dispersant should be selected to be appropriate to separate the particles within the dispersion. In this section, the dispersion of inorganic particles is discussed without surface modification of the particles. Surface modification is discussed in the following section. For particles formed in vapor based processes, better results are obtained by first dispersing the particles and then performing the surface modification.

While the nanoparticles useful for the formation of composites generally can be produced by any of several approaches, laser pyrolysis is particularly desirable approach for the synthesis of the particles. Due to the rapid quenching in the laser pyrolysis approach, the particles can be formed to be very uniform and with a suitable surface chemistry to facilitate dispersion of the particles. Furthermore, the precursors selected for the laser pyrolysis process influence the surface chemistry of the resulting particles. For example, the use of a chloride precursor provides chlorine atoms as a by product that are then available to cap the particle surfaces.

For metal/metalloid oxides particles, the crystalline structure terminates at the surface of the particle. In general, radicals are too reactive, so that the dangling bonds along the surface need to be terminated in ways that are made available in the particular synthesis approach. In some circumstances, relatively stable radicals are observed, such as titanium dioxide with a blue hue. Since the presence of the radicals can affect the optical properties, these materials are generally not desired. Alternatively, the oxygen atoms along the surface can form oxygen bridge structures or double bonds with oxygen atoms. Bridge structures and double bonds distort the crystal properties along the surface of the particles and introduce strain. The bridge structures and double bonded oxygen atoms can be expected to form if the particles are formed under highly oxidizing conditions, which are generally expected in flame or other thermal pyrolysis processes. Under less oxidizing conditions, mono-valent atoms can terminate the crystal surface, such as O—H or M-X bonds, where M is a metal atom and X can be a halogen atom. As described herein, evidence indicates that —OH groups along the surface seem favorable to the excellent dispersion of these particles in alcohols as well as contributing to a very high crystallinity of the particles.

In general, the dispersant should be selected based on the surface properties of the particles since the surface properties influence the interaction with the solvent. In general, —OH groups along the surface would favor dispersion in polar solvents. The surface chemistry also influences the formation of charges along the surface when the particles are placed in a liquid. The degree of surface charges can be expressed as a zeta potential, which is a concept borrowed from the field of colloidal chemistry. Commercial equipment is available to measure the zeta potential. It may or may not be desirable to add a surfactant that does not bond to the particle surface at this stage of the processing. Generally, an appropriate surfactant is displaced by a surface modifying agent that bonds to the particle surface at an appropriate stage of processing. Suitable surfactants can be selected for the particular particles and may be cationic surfactants, anionic surfactants, non-ionic surfactants and/or zwitter ionic surfactants.

In general, the metal oxide particles formed by laser pyrolysis can be well dispersed in water or alcohols at moderate concentrations with no surface modification. Suitable alcohols include, for example, small aliphatic alcohols, such as methanol, ethanol, propylene glycol, butanediol and the like. These alcohols generally form better dispersions than water at the same concentrations. Better dispersions are more stable and/or have a smaller secondary particle size indicating less agglomeration. In general, dispersions with well dispersed particles can be formed at concentrations of up to 15 weight percent inorganic particles, in other embodiments from about 0.25 to about 10 weight percent and in further embodiments from about 0.5 to about 9 weight percent. In some embodiments, for dispersions with well dispersed particles, the average secondary particle size can be no more than a factor of four times the average primary particle size, in further embodiments no more than about 3 times the average primary particle size and in additional embodiments no more than about 2 times the average primary particle size. With respect to the particle size distribution, essentially all of the secondary particles can have a size no more than 4 times the z-average secondary particle size, in further embodiments no more than about 3 times the z-average particle size and in other embodiments, no more than about 2 times the z-average particle size. Z-average particle sizes are measured using dynamic light scattering. Alternatively, volume average particle sizes can be used to evaluate secondary particle sizes, although z-average values are generally less variable in measurements. In some embodiments, the average secondary particle size can approximate the primary particle size. A person of ordinary skill will recognize that additional ranges of concentrations and secondary particle sizes within the explicit ranges above are contemplated and are within the present disclosure. As used herein, reference to essentially all of the particles indicates no more than 1 in one million particles.

In some embodiments, it has been discovered that an initial mixing of metal oxide particles with water can improve eventual dispersion in an alcohol. This provides some evidence that the water can modify the surface chemistry of the particles. While not wanted to be limited by theory, one explanation is that $OH^{-1}$ groups in the water undergo nucleophylic substitution with M-X groups on the particle surfaces to form M-O—H groups and $X^{-1}$ and/or open ring groups formed by bridging oxygen atoms. In particular, particles formed with chlorine atoms present are observed to create acidic conditions in the water consistent with the removal of $OH^{-1}$ and generation of $Cl^{-1}$. With the formation of —OH groups along the particle surface, the particles would be expected to disperse better in alcohols. Such a result has been found, as shown in Example 2 below. The water can be provides as a pure solvent or as a water alcohol blend. Also, the water can be heated, such as over 50° C., to accelerate the reaction with the water.

For the alteration of surface chemistry by water, the particles are mixed in water or aqueous solution. In general, the water reaction can be performed for at least about 1 minutes, in further embodiments from about 2 minutes to about 24 hours or more, although longer presence in the water generally does not further change the material properties, in other embodiments from about 5 minutes to about 10 hours, and in additional embodiments from about 10 minutes to about 4 hours. A person of ordinary skill in the art will recognize that additional ranges within these explicit time ranges are contemplated and are within the present disclosure. The particles do not need to be well dispersed during the contact with the water, so that higher concentrations can be used for this step. After a sufficient time for the dispersion in water, the particles can be precipitated through the blending of the solvent. In general, this can be performed through the addition of a sufficient amount of a less polar solvent that is miscible in water. Suitable solvents include, for example, acetone. Once the particles are removed from the aqueous solution, they can be rinsed one or more times with the selected dispersant to remove residual water. The particles are then dispersed in the alcohol or other selected dispersant. Appropriate mixing can be performed at each step. As noted above, the alteration of surface chemistry using water can be performed in flight within the reaction system used to synthesize the particles. Copending U.S. patent application Ser. No. 11/438,477 to Chiruvolu et al., entitled "In-Flight Modification of Inorganic Particles Within a Reaction Product Flow," incorporated herein by reference, describes suitable processes and apparatuses for performing in-flight processing. For example, the laser pyrolysis apparatus described below can be modified to provide for the introduction of an aerosol of water into the product flow prior to the collector.

Secondary particle size can generally be evaluated using dynamic light scattering, although other approaches such as laser diffraction and acoustic scattering can also be used in some commercial instruments. Measurements of the scattered light can be used to obtain detailed information on the particle sizes in the dispersion. Suitable light scattering particle size analyzers are commercially available. For example, suitable particle size analyzers are available from Horiba Instruments, Inc, Irvine, Calif. and Malvern Instruments. Ltd., UK.

The particle dispersions can be stable for extended periods of time. In general, the particle dispersions can be stable upon sitting undisturbed for at least about 24 hours in and in some embodiments at least about a week, and some have been observed to be stable for at least several months. The dispersions can be filtered or centrifuged to remove impurities and any rare large agglomerates. In general, precipitates look dark indicating impurities that have been introduced to the samples at earlier handling steps. The filtrate can be used for further processing. For example, micron scale filters are available from Whatman Inc, Florham Park, N.J. Similarly, the dispersions can be centrifuged at 3000 rpm to 4000 rpm for from about 3 minutes to about 10 minutes. After centrifugation, the dispersions can be decanted from any sediment.

In general, some type of mixing is used to drive the formation of the dispersion. For example, the combination of the particles and dispersant can be mixed through sonication which delivers sound waves to the blend to mix the combination. Alternatively or additionally, shear can be applied directly to mix the blend with a rotary blender, shaker, blade mixer, spin bar or the like. Generally, the mixing is performed for at least about 5 minutes, in some embodiments for at least about 10 minutes, in further embodiments for 12 minutes to about 24 hours and in additional embodiments for about 15 minutes to about 4 hours. A person of ordinary skill in the art will recognize that additional ranges of mixing times within the explicit ranges above are contemplated and are within the present disclosure. Suitable sonication and blending apparatuses are commercially available.

Once good dispersions are formed, it is generally desirable to further process the particles. For example, the particles can be surface modified with an organic or silicon-based surface modifying agent. The surface modification can further stabilize the particles in a dispersion. Thus, the surface modification can be used to form dispersions with even longer term stability and at even greater concentrations, as described further below. In addition, the dispersed particles can be directly processed into a composite without surface modification. While it may be desirable to have a greater concentration of dispersed particles prior to composite formation, the direct use of the particles for composite formation shortens one step from the process. However, surface modification provides the ability to uniformly disperse the particles in a broader range of polymers due to the ability to select surface modification compositions with side chains that are compatible with the polymer. Thus, for many embodiments, it is desirable to form surface modified particles as described in the following section.

Surface Modification of Inorganic Particles

The surface modification of the inorganic particles can improve stability of the particle dispersions, provide for dispersion of the particles in a wider range of liquids and provide for desired processing flexibility for the formation of composites as well as facilitating the uniform dispersion of the inorganic particles with a wider range of polymers. While surface modifiers can merely coat the surface, improved stability of the coated particles is accomplished with surface modifiers that are chemically bonded to the surface. In particular, alkoxysilanes react with metal oxides to form silicon-O-metal bonds to form a stable surface coating with the release of a corresponding compound from the displaced silane functional group. An improved surface coating is achieved with improved —OH functional group coverage on the surface of the metal oxide particles. The surface modification process can involve a switch of dispersants. For convenience of terminology, a surface modifying compound refers to a compound that adds at least 3 atoms to the particle surface when it bonds to the particle surface, to distinguish compositions, such as water, that modify the surface of a metal oxide particle such as through the substitution of an —OH group.

A range of surface modifying compounds can be used to chemically bond to the particle surfaces. Suitable functional groups for bonding to inorganic particles with different compositions are described in U.S. Pat. No. 6,599,631 to Kambe et al, entitled "Polymer-Inorganic Particle Composites," incorporated herein by reference. Alkoxysilanes provide stable bonding to metal oxide particles. In particular, trialkoxysilanes provide very stable bonding to the particle surface with potentially three points of bonding. The fourth side chain of the trialkoxysilanes provides the ability to influence the dispersability and other surface properties of the surface modified inorganic particles. Specifically, the fourth side chain of the silane can be selected to improve dispersability in a selected solvent and/or to provide a reactive functional group for further processing. Alternatively or additionally, the fourth side chain can be used to stabilize the interaction of the surface modified particle with a selected polymer so that a uniform composite can be formed. Similarly, polydialkoxysiloxy silanes provide stable bonding with the ability of each monomer unit to form two bonds to the particle. The polymer can wrap around the particles during the bonding process. In addition to alkoxy silanes, chemical compounds with other functional groups can form bonds to metal oxide particles. Specifically, compounds with chlorosilicate (—SiCl) groups, some amine groups, carboxylic acid groups and hydroxide groups can also bond to metal oxide particle surfaces. Additional functional groups of these compounds can be similarly selected to yield desirable properties for the resulting surface modified particles.

With respect to the alkoxy side chains of the silanes, methoxy groups and ethoxy groups have been found to be effective in reacting with metal oxide particle surfaces, and a range of compounds with these functional groups are commercially available. Suitable fourth functional groups for the trialkoxy silanes include, for example, alkyl groups, epoxide groups (—$(CH_2)_n$CHCH$_2$O$_{bridge}$), methacrylate (—$(CH_2)_n$OOC=CH$_2$), isocyanate (—$(CH_2)_n$NCO), thiol (—$(CH_2)_n$SH), acetyl (—$(CH_2)_n$OOCCH$_3$), hydroxybenzophenyl (—$(CH_2)_n$OC$_6$H$_5$(OH)COC$_6$H$_5$), allyl (—CH$_2$CH=CH$_2$), and phenethyl (—$(CH_2)_n$C$_6$H$_5$). In general, the surface modifying compound can be coated at a coverage from less than a monolayer to four or more monolayers. The amount of coverage is estimated based on the surface area of the particles and the amount of compound that can be expected to pack along the particle surface.

The surface modified particle dispersions can be stably formed at greater particle concentrations with no visible settling for at least a week. In particular, stable dispersion can be formed at greater than about 2 weight percent solids, in further embodiments at least about 4 weight percent solids and in other embodiments from about 5 weight percent solids to about 15 weight percent solids. The surface modified particles can have a z-average particle size of no more than about 75 nm, in other embodiments no more than about 60 nm, and in further embodiments no more than about 50 nm for the z-average particle size. With respect to the particle size distribution, essentially all of the secondary particles can have a size no more than 4 times the z-average particle size, in further embodiments no more than about 3 times the z-average particle size and in other embodiments, no more than about 2 times the z-average particle size. In general, the z-average secondary particle size can be no more than a factor of four times the number average primary particle size, in further embodiments no more than about 3 times the number average primary particle size and in additional embodiments no more than about 2 times the number average primary particle size. A person of ordinary skill in the art will recognize that additional ranges of particle loadings and secondary particle sizes and distributions within the explicit ranges above are contemplated and are within the present disclosure. Secondary particle sizes are evaluated with dynamic light scattering.

Two processes can be used to perform the surface modification. In one approach, an unstable, high concentration dispersion can be formed with the particles, and the surface modification is performed to stabilize the high concentration dispersion. However, better particle dispersions generally are obtained through first forming a dilute, stabile dispersion of the particles without surface modification and then performing the surface modification.

In the direct approach, the liquid is selected to balance the dispersion of the unmodified particles, the solubility of the surface modifying compound unbound to the particles and the dispersion of the particles following surface modification. Generally, the liquid is not a particularly good dispersant for the unmodified particles. Similarly, the liquid may not be a good solvent for the surface modifying agent. But if the surface modifying agent is somewhat soluble in the liquid and the unmodified particles can be dispersed with mixing, the surface modification reaction can be performed. As the particles become surface modified, the dispersion may stabilize as the reaction proceeds.

Better dispersion results are obtained if the inorganic particles without a surface modifier are first stably dispersed with a desirably small average secondary particle size. As noted above, alcohols, especially propylene glycol, and water/alcohol blends are good dispersants for the unmodified metal oxide particles. The surface modifying compound can be added directly into the alcohol or water/alcohol blend if it has some solubility, or the surface modification compound can be dissolved into a solvent that is miscible with or soluble in the liquid of the particle dispersion. After the surface modification is complete, the particles can be precipitated from the dispersant by mixing a suitable liquid into the dispersion that is soluble or miscible with the dispersant used to perform the surface modification, and then re-suspended in a desired dispersant. The surface modified particles can be stored or shipped in a liquid suitable for further processing.

In general, it has been found very effective to settle the particles by forming a liquid mixture in which the stability of the dispersion is lost. Centrifugation or filtration can be used to efficiently separate the particles from the liquid once they are no longer stably dispersed. If the particles are centrifuged, the liquid is decanted from the precipitated particles. The particles can be washed one or more times with a selected dispersant to remove residual liquid. Then, the particles can be redispersed in the selected liquid. In this way, the liquid can be changed for a later processing step through the selection of a surface modifier that facilitates dispersion in the selected liquid.

Polymer Composite Compositions and Properties

The inorganic particles can be well dispersed as described herein within a polymer composite. In general, the particles may or may not be surface modified, and the polymer may or may not bond with the particles directly or indirectly. To obtain composites with desirable optical properties, the particles should be well dispersed prior to forming the composite and blended uniformly to form the composite, as described further below. The resulting composites can have very high transmittance at particle loadings that significantly increase the composite index of refraction relative to the index of refraction of the polymer.

Suitable polymers include, for example, organic polymers, silicon-based polymers and mixtures thereof. Suitable organic polymers include, for example, polyamides (nylons), polyimides, polycarbonates, polyurethanes, polyacrylonitrile, polyacrylic acid, polyacrylates, polyacrylamides, polyvinyl alcohol, polyvinyl chloride, heterocyclic polymers, polyesters, modified polyolefins and mixtures and reasonable copolymers thereof. Composites formed with nylon polymers, i.e., polyamides, and inorganic nanoparticles can be called Nanonylon™. Suitable silicon-based polymers include, for example, polysilanes and polysiloxane (silicone) polymers, such as poly(dimethylsiloxane) (PDMS) and poly(methylphenyl siloxane)(PMPS). Polysiloxanes can be desirable polymers because of their transparency to visible and ultraviolet light, high thermal stability, resistance to oxidative degradation and their hydrophobicity. Other inorganic polymers include, for example, phosphazene polymers (phosphonitrile polymers). The polymers can be crosslinked to provide desired mechanical properties to the composite.

Block copolymers can be used, which can have different blocks of the polymer that segregate, which is a standard property of many block copolymers. Suitable block copolymers include, for example, polystyrene-block-poly(methyl methacrylate), polystyrene-block-polyacrylamide, polysiloxane-block-polyacrylate and mixtures thereof Block copolymers with other numbers of blocks and other types of polymer compositions also can be used. The inorganic particles can be associated with only one of the polymer compositions within the block such that the inorganic particles are segregated with that polymer composition within the segregation block copolymer. For example, an AB di-block copolymer can have inorganic particles primarily essentially only within block A.

If the polymer in the composite is bonded to the inorganic particles either directly or indirectly, the polymer can be selected or modified to have suitable reactive functional groups. For bonding to metal oxide particles, in addition to alkoxy silane groups, chlorosilicate (—SiCl) groups, some amine groups, carboxylic acid groups and hydroxide groups can bond to the metal oxide particles. A surface modifying compound can be selected to have an appropriate functional group to react with a functional group of the polymer. A few representative examples which can be appropriately put on the surface modifier or the polymer, include, for example, carboxylic acid groups or epoxy group that are each reactive with amine groups, thiol groups or hydroxide groups. Suitable functional groups for binding surface modifying compositions or linkers with a polymer are described further in U.S. Pat. No. 6,599,631 to Kambe et al., entitled "Polymer-Inorganic Particle Composites," incorporated herein by reference.

The loading of inorganic particles can be selected to achieve desired properties of the composite. In general, the properties of interest include mechanical properties, such as mechanical strength and mechanical stability as well as functional properties, such as index of refraction. In general, low particle loadings can be used if desired, but in some embodiments it is desirable to use high particle loadings. Particle loadings can be achieved with very good dispersion with up to about 80 weight percent, in other embodiments from about 1 weight percent to about 75 weight percent and in further embodiments from about 5 weight percent to about 65 weight percent. For some optical applications, the composite comprises at least about 5 weight percent particles. A person of ordinary skill in the art will recognize that additional ranges of particle loadings within the explicit ranges above are contemplated and are within the present disclosure.

The index of refraction of the composite is approximately a linear combination by the volume ratios of the inorganic particles and the polymer. In particular, rutile $TiO_2$ and $ZrO_2$ have high indices of refraction such that they are desirable materials for the formation of high index of refraction composites. If used in a polymer with an index of refraction of about 1.4 index units, the composite can be formed with an index of refraction approaching 2 or higher across the visible portion of the light spectrum.

For optical applications, it can be desirable for the composite to have a high transmission in the visible portion of the spectrum. If small inorganic particles are used, the particles do not absorb light in the visible region. Specifically, since the particles are much smaller than the wavelength of visible light if the particle sizes are less than 100 nm, the absorption spectrum of the particles is shifted into the ultraviolet and the visible spectrum fall effectively to zero if the average primary particle diameter is on the order of 20 nm or less and the particles are highly crystalline. However, the particles in the composite can scatter visible light, thereby lowing the transmission of visible light, if the particle are either highly agglomerated or the particles are not uniformly distributed within the polymer. By forming a well dispersed particle dispersion with a z-average secondary particle size is on the order of 100 nanometers or less and uniformly distributing the particles within the polymer, high levels of transmission can be achieved for the composite through the reduction of scattering. Improved composites can be formed if the z-average secondary particle size is made even smaller.

The transmission can be measured relative to the polymer without any inorganic particles to provide a reference point. In some embodiments with a particle loading of at least about 5 weight percent in the composite, the composite has a transmission when formed into a film with a thickness of 5 microns for at least one visible wavelength of at least 85 percent relative to the polymer alone, in other embodiments at least about 87.5 percent, in further embodiments at least about 90 percent, in other embodiments at least about 92 percent, in some embodiments at least about 95 percent, and in additional embodiments from about 92 percent to about 98 percent. In some embodiments, these levels of transmission through the composite film extend across the entire visible wavelength range. In additional embodiments, these values of transmission through the composite film are achieved with a particle loading from about 20 weight percent to about 85 weight percent within the composite. A person of ordinary skill in the art will recognize that additional ranges of transmission within the explicit ranges above are contemplated and are within the present disclosure.

The composite can comprise useful additives, such as conventional additives for polymer materials. Generally the additives are included in amounts of no more than about 5 weight percent of the composite weight. Suitable additives include, for example, viscosity modifiers, antioxidants, UV stabilizers and the like. These additives can be selected to be transparent to visible light.

Processes for Forming Polymer-Inorganic Composites

The processing to form the composite materials is significant with respect to obtaining desirable properties for the composite material. In particular, it is desirable to form the composite with well dispersed particles such that the material appears uniform on appropriate distance scales for the function contemplated for the material. For optical materials functioning in the visible portion of the electromagnetic spectrum, it is desirable for the material to be essentially uniform on a distance scale of about 500 nm or less. This uniformity can be indirectly measured through the resulting transparency and the particles can be observed in the composite, for example, using transmission electron microscopy for films and/or scanning electron microscopy for cross sections and surfaces of thicker films.

In general, the polymerization can be performed in the presence of the nanoparticles, and/or the nanoparticles can be associated with a polymer solution. The surface modification of the particles should result in a surface chemistry for the modified particles that is consistent with the polymer so that the particles do not agglomerate after introduction into the polymer solution. Generally, it is desirable to use surface modified inorganic particles so that higher particle concentrations can be used in the processing to form the composites.

Assuming that the modified particles are compatible with the polymer, as the particles are dispersed uniformly within the polymer during the processing, the particles remain well dispersed. To have a modified particle compatible with the polymer, the surface modifying moiety can have a side chain with similar chemical formula or electronegativity as the polymer. The modified particles may or may not chemically bond with the polymer. Thus, processing approaches can be designed that avoid large concentrations of inorganic particles unassociated with polymer so that the particles can be more uniformly dispersed and stabilized within the polymer composition without agglomerating. Once the inorganic particles significantly agglomerate, it generally is difficult to de-agglomerate the inorganic particles while in the process of forming the composite. Once the inorganic particles are well dispersed within the polymer, the well dispersed composite solution can then be processed into a finished product, and the solvent can be removed in this process. Crosslinking of the polymer can be performed if desired.

To form a uniform solution of modified inorganic particles with a polymer, it has been found to be effective to add a good dispersion of the particles to a mixing solution of the polymer. Good dispersions are fully described above and generally have average secondary particle diameters of no more than about 100 nm. The inorganic particles should be well dispersed prior to addition to the polymer solution. In general, the rate of addition should avoid high concentrations of particles not well dispersed with the polymer. These conditions generally depend on the respective concentrations of the particle dispersion and the polymer, the mixing conditions and the apparatus configuration. A person of ordinary skill in the art will be able to empirically evaluate these conditions based on the teachings herein.

In general, the dispersant used to form a good dispersion of the surface modified inorganic particles may not be the same liquid as the solvent used to dissolve the polymer. However, the particle dispersant generally can be selected to be miscible with the polymer solvent, and the surface modifier composition and the polymer can be selected to facilitate this selection of liquids. If this miscibility is satisfied, it has been observed that a uniform composite can be formed. Therefore, it can be a significant processing consideration to have the ability to transfer the modified particles between liquids to obtain a dispersion in an appropriate liquid.

In general, the composite can be further processed using a range of polymer processing technique, including conventional processing approaches. The composite can be concentrated by evaporation of solvent and/or precipitating the composite through the addition of a miscible liquid to form a liquid blend in which the composite is no longer soluble. The precipitated composite may or may not be re-suspended in a suitable liquid. In addition, composite films can be formed through various coating approaches, such as spin coating, dip coating, spray coating and the like. Films can be formed with a desired thickness generally from 10 nm to 1 centimeter, in further embodiments from about 500 nm to about 500 microns and in other embodiments from about 1 micron to about 50 microns. A person of ordinary skill in the art will recognize that additional ranges of film thicknesses within the explicit ranges above are contemplated and are within the present disclosure. In addition, the composite can be cast using injection molding, compression molding, extrusion or the like. The formed composite can be assembled into a suitable product.

Applications to High Index Films and Adhesives

The ability to form highly transparent inorganic particle composites provides the ability to form high index of refraction films and high index of refraction adhesives. The high index of refraction films can be used to form protective coatings over optical elements. The protective coatings can seal out moisture and other atmospheric assaults while providing some level of protection from physical contact. Similarly, the selection of the polymer can be directed to the selection of a polymer useful as an adhesive. Adhesives have the ability to wet surface in contact to form an adhesive bond.

The polymers incorporated in the composites for the films and adhesives can be selected to harden or crosslink upon drying, exposure to atmospheric oxygen and/or upon exposure to radiation, such as UV light, corona radiation or the like. Many of the polymers discussed above are suitable for film formation.

A variety of adhesives are well known in the art. Representative adhesive compositions are described for example in U.S. Pat. No. 5,623,011 to Bernard, entitled "Tackified Emulsion Pressure-Sensitive Adhesive," incorporated herein by reference. Adhesive suitable for adhering a lens or the like are described in published U.S. Patent Applications 2004/0046501 to Hayashi, entitled "Sealing Substrate, method of Fabricating the Same, Display Device, and Electronic Instrument," and 2005/0003220 to Kitahara et al., entitled "Composite Molding With Adhesive Layer Comprising Conjugated Diene Polymer Having Cyclic Structure, and Coating Material," both of which are incorporated herein by reference.

Similarly, the composites are suitable for antireflective films. The formation of antireflective films using inorganic particles is described further, for example, in published U.S. patent application 2003/0096102A to Yoshihara et al., entitled "Coating Composition, Coating Film Thereof, Antireflection Coating, Antireflection Film, Image Display, and Intermediate Product," incorporated herein by reference. Similarly, composites can be used for brightness enhancing films, index matching films for ophthalmic lenses and UV blocking films for windows.

EXAMPLES

Example 1

Inorganic Particle Synthesis Through Laser Pyrolysis

In this example, the synthesis of rutile nanoscale $TiO_2$ is described using laser pyrolysis.

Figure 2:
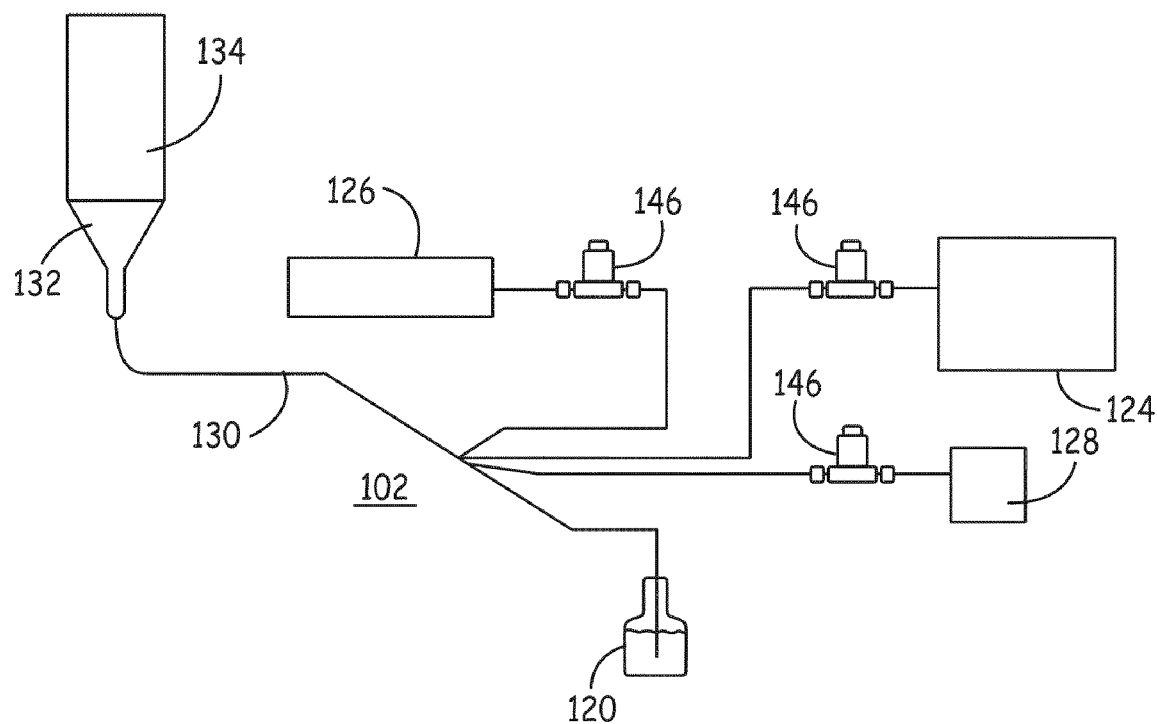
FIG. 2 is a schematic view of a reactant delivery system to deliver reactants to a laser pyrolysis apparatus.

Referring to FIG. 1, laser pyrolysis system 100 used in these experiments is shown schematically. Laser pyrolysis system 100 comprises a reactant delivery apparatus 102, reaction chamber 104, shielding gas delivery apparatus 106, collection apparatus 108 and a CW $CO_2$ laser 110. Referring to FIG. 2, reactant delivery apparatus 102 comprises a source 120 of a precursor composition. Precursor source 120 comprises a flash evaporator or a volatile-vapor bubbler that supplies a vapor of the precursor at a selected vapor pressure. The precursor used for these experiments was liquid $TiCl_4$ (Strem Chemical Inc., Newburyport Mass.).

The vapor from precursor source 120 is mixed with gases from $C_2H_4$ source 124, inert gas source 126 and/or $O_2$ source 128 by combining the gases in a single portion of tubing 130. The combined gas/vapor in tube 130 passes through a duct 132 into channel 134, which is in fluid communication with reactant inlet 156 (FIG. 1).

Reactant supply system 102 connects to the main chamber 150 at injection nozzle 152. The end of injection nozzle 152 has an annular opening 154 for the passage of inert shielding gas, and a reactant inlet 156 (left lower insert) for the passage of reactants to form a reactant stream in the reaction chamber. Reactant inlet 156 is a slit, as shown in the lower inserts of FIG. 1. The flow of shielding gas through annular opening 154 helps to prevent the spread of the reactant gases and product particles throughout reaction chamber 104.

Tubular sections 160, 162 are located on either side of injection nozzle 152. Tubular section 160 comprises a ZnSe cylindrical lens as window 164. Tubular section 162 comprises a power meter that functions as a beam dump 166. Tubular inlets 168, 170 provide for the flow of inert shielding gas into tubular sections 160, 162 to reduce the contamination of window 164 and beam dump 166. Tubular inlets 168, 170 are connected to shielding gas delivery apparatus 106.

Referring to FIG. 1, shielding gas delivery system 106 comprises inert gas source 180 connected to an inert gas duct 182. Inert gas duct 182 flows into annular channel 184 leading to annular opening 154. A mass flow controller 186 regulates the flow of inert gas into inert gas duct 182. Flow to tubes 168, 170 is controlled by a mass flow controller 188.

The path of the reactant stream continues to collection nozzle 210. Collection nozzle 210 has a circular opening 212, as shown in the upper insert of FIG. 1. Circular opening 212 feeds into collection system 108. The chamber is designed to add additional inert gas to the flow following particle formation to cool the particles. Collection system 108 comprises a filter 214 within the gas flow to collect the product particles. Pump 216 maintains collection system 108 at a selected pressure.

Titanium tetrachloride (>98% pure) was delivered from a flash evaporator or volatile-vapor bubbler. $C_2H_4$ gas was used as a laser absorbing gas, and argon was used as an inert diluent gas. The reactant mixture containing the titanium precursor, Ar, $O_2$ and $C_2H_4$ was introduced into the reactant nozzle for injection into the reaction chamber. Additional parameters of the laser pyrolysis synthesis relating to the particles of Example 1 are specified in Table 1.

TABLE 1

| | 1 | 2 | 3 |
|---|---|---|---|
| $TiCl_4$ (PPM) | 2000 | 1900 | 7300 |
| Pressure (Torr) | 50 | 50 | 50 |
| Nitrogen - Window (SLM) | 5 + 5 | 5 + 5 | 5 + 5 |
| Argon - Shielding (SLM) | 2 | 1.1 | 1 |
| Ethylene (SLM) | 0.5 | 1.7 | 4 |
| Diluent Gas (Argon) (SLM) | 1.9 | 4.5 | 4.8 |
| Oxygen (SLM) | 1.1 | 5 | 10 |
| Laser Input (Watts) | 1500 | 1500 | 1500 |
| Laser Output (Watts) | 1420 | 1420 | 1420 |
| Production Rate (g/hr) | 1.0 | 5.3 | 20.8 |
| BET ($m^2/g$) | 167 | 158 | 108 |
| Phase Purity (% Rutile) | 97 | 78.2 | 100 |

Figure 3:
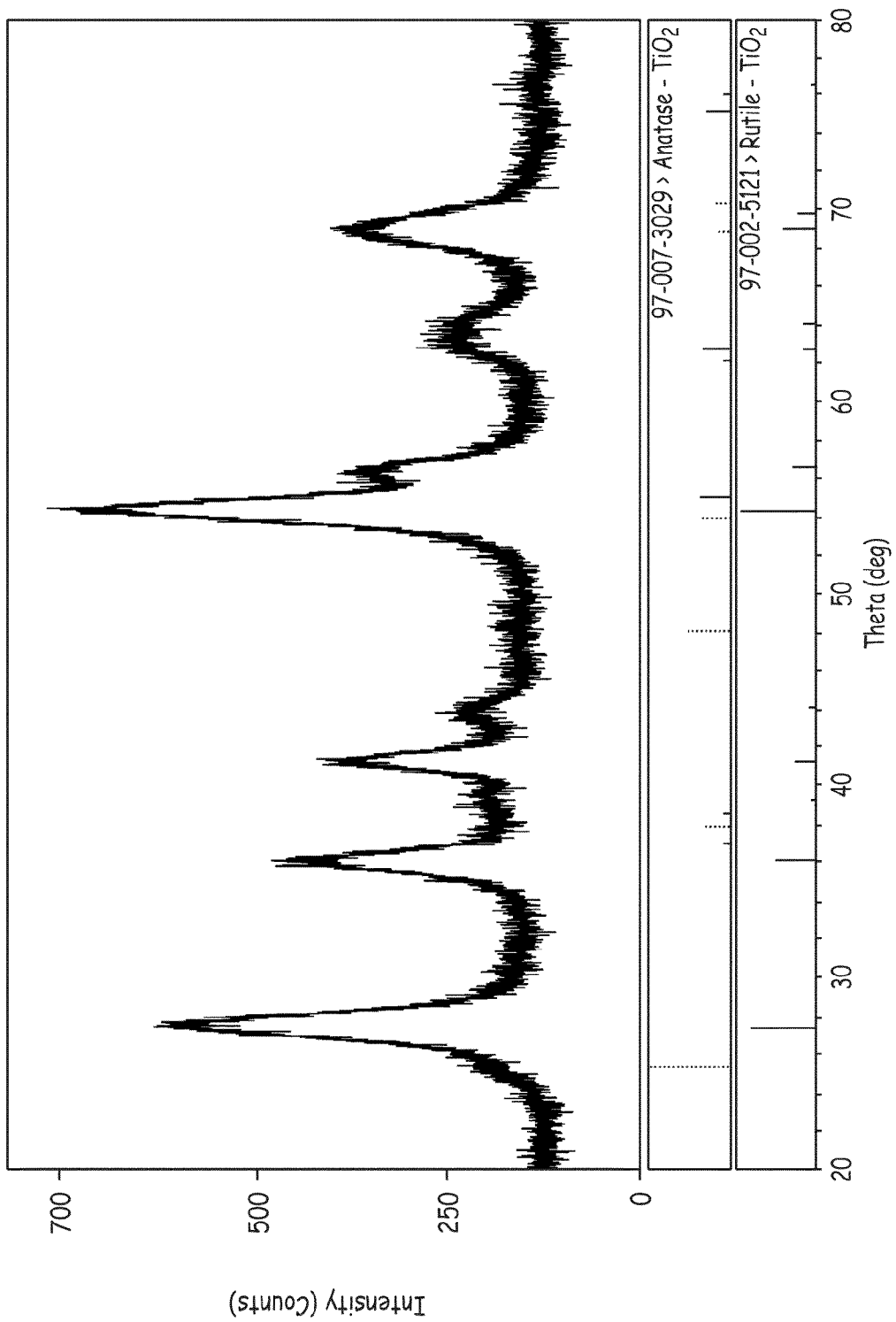
FIG. 3 is a representative x-ray diffractogram for rutile titanium dioxide produced as described in Example 1.

To evaluate the atomic arrangement, the samples were examined by x-ray diffraction using the Cr(Kα) radiation line on a Rigaku Miniflex x-ray diffractometer. In each of the samples, crystalline phases were identified that corresponded to rutile $TiO_2$ by comparison with known diffractograms. A representative x-ray diffractogram is shown in FIG. 3.

Figure 4:
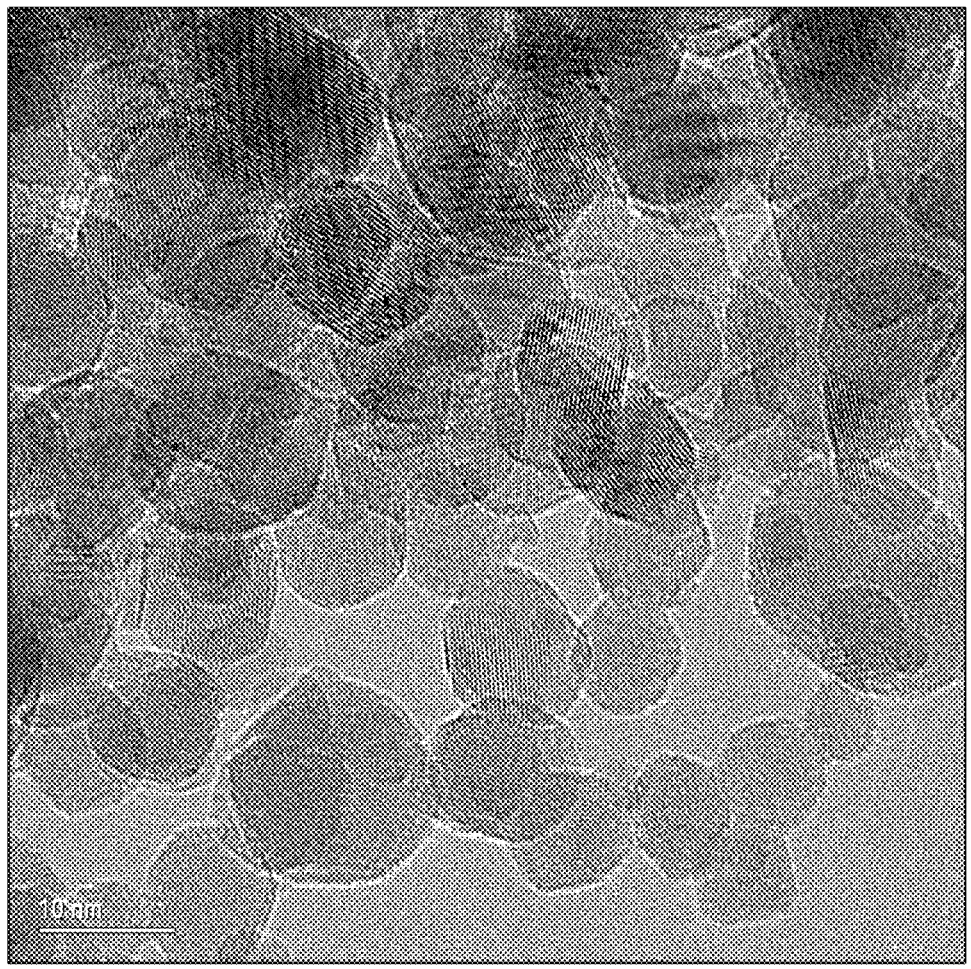
FIG. 4 is a representative transmission electron micrograph for rutile titanium dioxide produced as described in Example 1.
Figure 5:
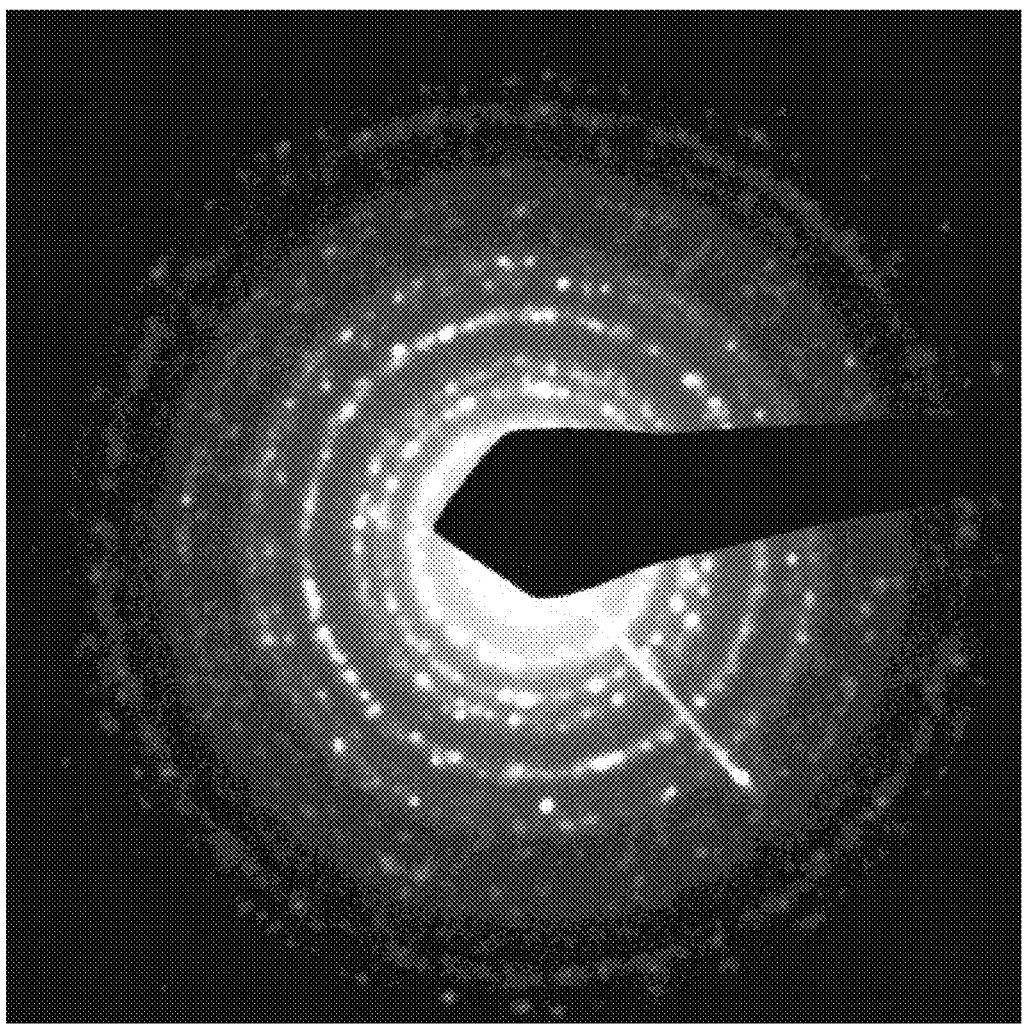
FIG. 5 is a representative Selected Area Diffraction image for rutile titanium dioxide produced as described in Example 1.

Transmission electron micrographs were taken of similar samples. These micrographs show a narrow distribution of particle sizes with diameters ranging from 5 nm to 20 nm. A representative transmission electron micrograph is shown in FIG. 4. Particles exhibit crystal lattices consistent with rutile phase $TiO_2$. Diffraction patterns obtained from Selected Area Diffraction images are also consistent with rutile phase $TiO_2$, as shown in FIG. 5.

Example 2

Dispersion of As-Synthesized Particles

This example demonstrates the ability to disperse $TiO_2$ particles formed by laser pyrolysis in several different solvents. Alcohol dispersions are formed directly and following an initial dispersion in water.

The $TiO_2$ particles were formed essentially as described in Example 1. The as-synthesized particles had an average primary particle size from about 7 nm to about 10 nm. The powders of $TiO_2$ were added to the liquid so that the inorganic powder was present at 0.5 weight percent of the dispersion. The mixtures were sonicated for 2 hours with a Branson bath sonicator (Branson Sonic Power Co., Danbury Conn.). Following completion of the sonication, the particle sizes of the dispersed powders was evaluated using dynamic light scattering with a Mavern Zetasizer. Results for dynamic light scattering measurements are often reported as an intensity average, referred to as the z-average or cummulants mean since this is a relatively more stable measurement than other averages. Correspondingly, the distribution width is reported as the polydispersity index (PDI).

Figure 6:
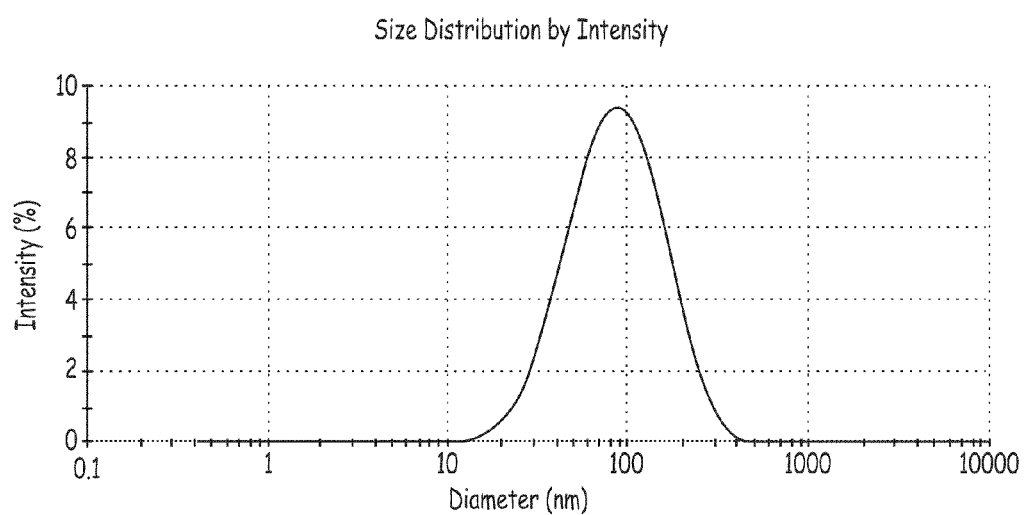
FIG. 6 is a dynamic light scattering plot of a dispersion of titanium oxide particles in water at 0.5 weight percent.
Figure 7:
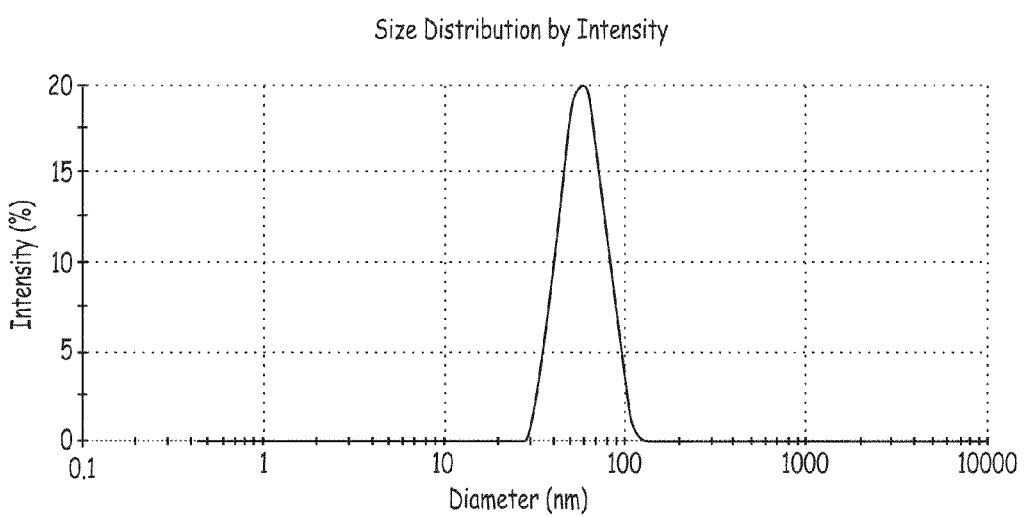
FIG. 7 is a dynamic light scattering plot of a dispersion of titanium oxide particles in methanol at 0.5 weight percent.
Figure 8:
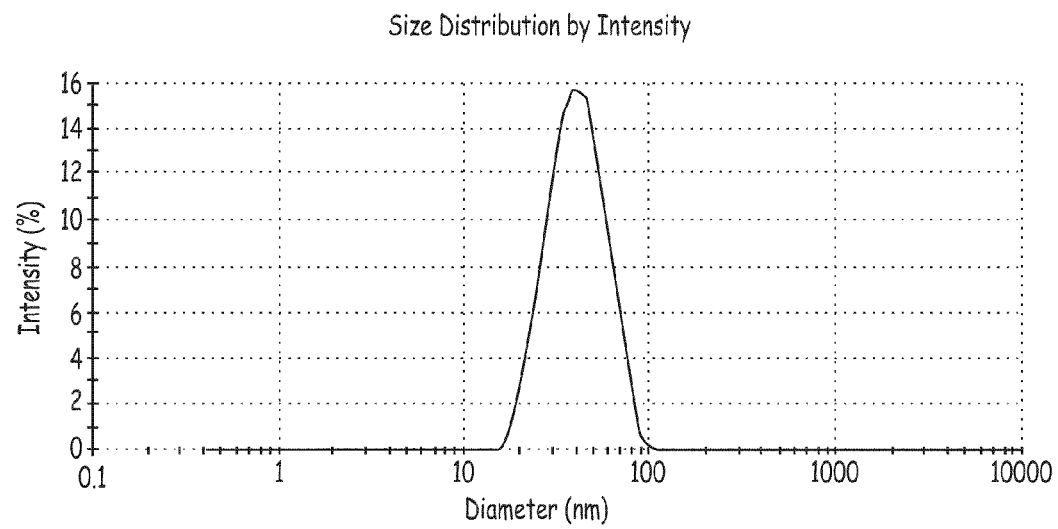
FIG. 8 is a dynamic light scattering plot of a dispersion of titanium oxide particles in propylene glycol at 0.5 weight percent.

Particle size measurements for representative samples are shown in FIGS. 6-8 for water, methanol and propylene glycol, respectively. The samples were centrifuged at 3500 rpm for 5 minutes to remove contaminants. After centrifugation, the supernatent is transferred to another container and the sediment is discarded. These samples had z-average particle sizes of 73.2 nm, 54.3 nm and 37.1 nm, respectively, and PDI of 0.249, 0.149 and 0.107, respectively. Similar trends were observed with many samples of $TiO_2$ powder. Thus, the best dispersions are observed for propylene glycol, and water yields reasonable dispersions, but not as good as obtained with alcohols.

For the preparation of additional samples, the dispersion of the particles in the alcohols was performed by first mixing the powders with water and then transferring the particles to the alcohol. First, 0.2 g of $TiO_2$ was added to 2 ml of water. This mixture was sonicated for about 30 minutes at 60° C. Then, acetone was added in about an equal volume as the water to drive the particles from the dispersion, and the dispersion was centrifuged at 6000 rpm for 10 minutes. The liquid was decanted off of the settled particles and the particles were rinsed with acetone to remove any residual water. Then, the particles were added to alcohol, and the new mixture was sonicated for 2 hours. Then, the particle size was measured again.

Figure 9:
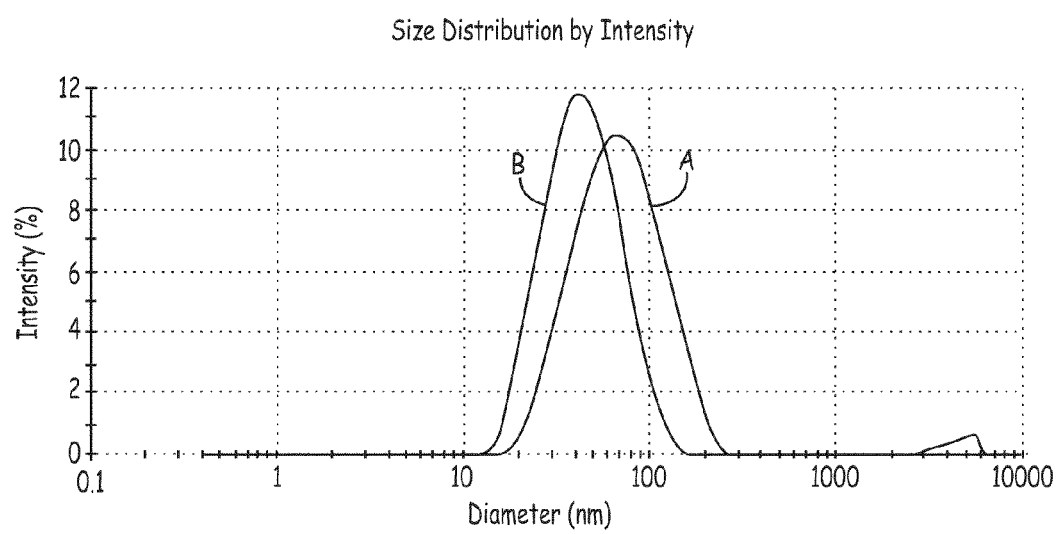
FIG. 9 is a dynamic light scattering plot of a dispersion of titanium oxide particles in methanol following a pretreatment with water.
Figure 10:
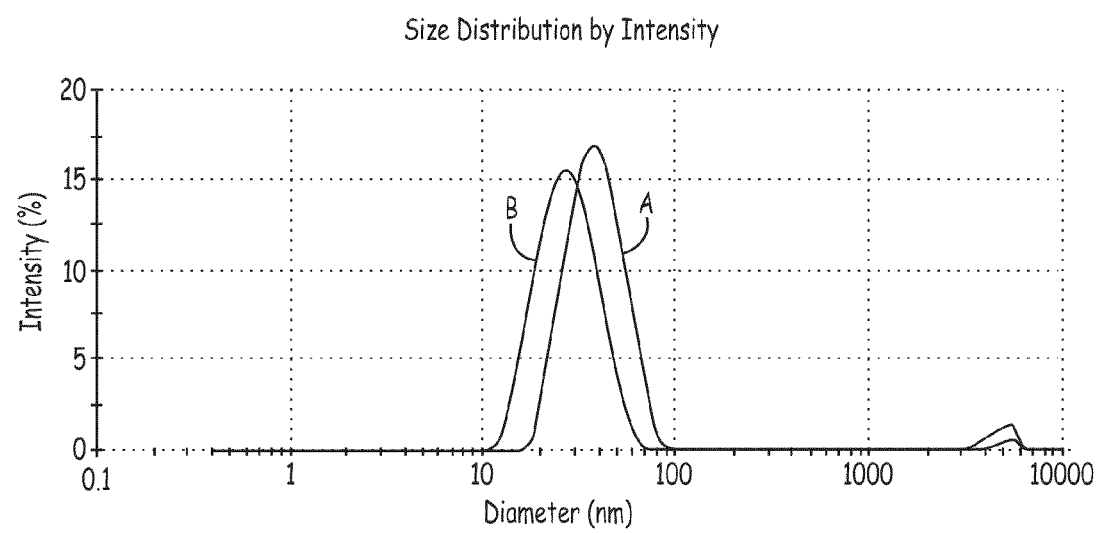
FIG. 10 is a dynamic light scattering plot of a dispersion of titanium oxide particles in propylene glycol following a pretreatment with water.

For the re-dispersion of the particles in methanol and propylene glycol at 0.5 weight percent solids, the particle size distributions are shown in FIGS. 9 and 10, respectively, with the corresponding dispersions without the water pre-treatment shown in the A plot and the alcohol dispersion following the water pre-treatment shown in the B plot. The z-average particles sizes for the alcohol samples were 39.6 nm and 27.3 nm, respectively, with PDI of 0.216 and 0.232. The alcohol dispersions following pre-treatment had small clusters of particles around 5 to 6 microns, which can be removed through centrifugation.

Figure 11:
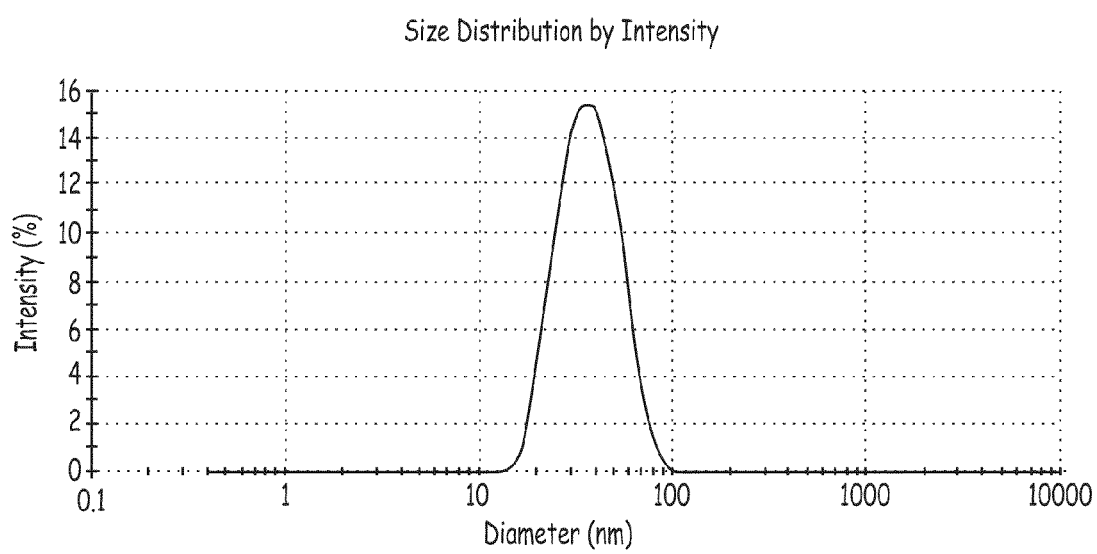
FIG. 11 is a dynamic light scattering plot of a dispersion of titanium oxide particles in propylene glycol following bead milling.

Higher concentrations of inorganic particles in propylene glycol were stably dispersed following bead milling. The bead milling was performed with 0.1 mm yttrium-stabilized zirconium beads at a speed of 3720 rpm using a Netzsch (Germany) MiniCer brand bead mill with recirculation for 100 minutes. The bead milling was performed in the presence of polypropylene glycol. The bead milling was performed under conditions selected not to fragment the primary particles since this fragmentation would be expected to lower the crystalline quality of the particles as well as lowering the uniformity and fusing some particles from the resulting heat. At the completion of the grinding, the material was diluted to 9 weight percent solids. The resulting particle size distribution is shown in FIG. 11. The Z-average particle size was 32.04 nm with a PDI of 0.194.

Example 3

Surface Modification of TiO with Alkoxysilanes

This example demonstrates the surface modification of titania particles with four different alkoxysilanes having different chemical properties. These four different silanes are discussed in this example as representative compounds of many tested. The $TiO_2$ powders were formed essentially as described in Example 1.

Figure 12:
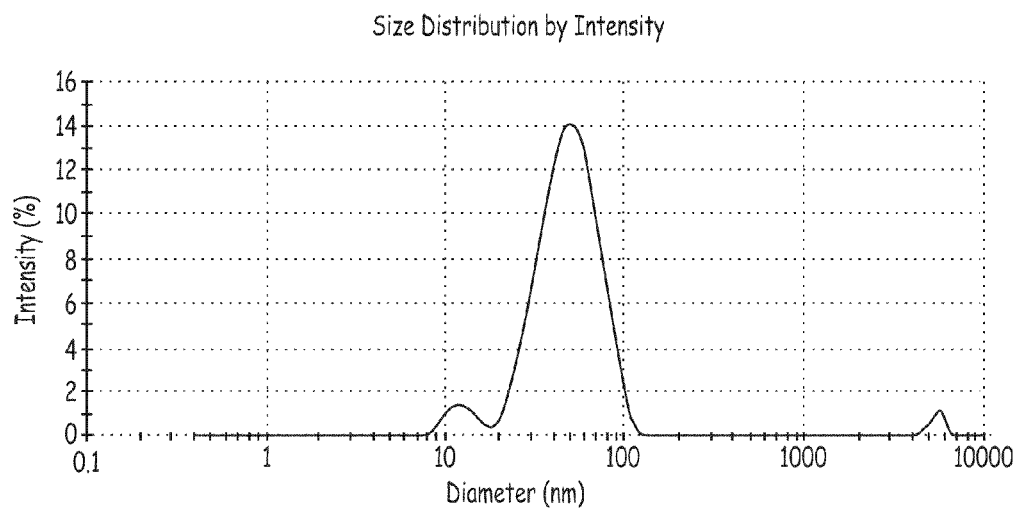
FIG. 12 is a dynamic light scattering plot of another embodiment of a dispersion of titanium oxide particles in propylene glycol after a water pretreatment.

In the first representative version of silane surface modification, octadecyl trimethoxy silane is used to surface modify $TiO_2$ to form a 5 weight percent solid dispersion in toluene. The $TiO_2$ particles were contacted with water to increase the surface density of —OH groups. This was performed by dispersing 5.5 g of $TiO_2$ powder in 40 ml water. This dispersion was sonicated at 60° C. for 0.5 hours. Acetone was added to precipitate the water treated particles, and the precipitate was washed once with acetone. The particles were then dispersed in 400 ml propylene glycol, and the new dispersion was sonicated for 1.5 hr. After sonication was completed, the dispersion was centrifuged at 4000 rpm for 5 minutes, and the precipitate was discarded. The secondary particle size was measured by dynamic light scattering, and the particle size distribution is shown in FIG. 12.

Figure 13:
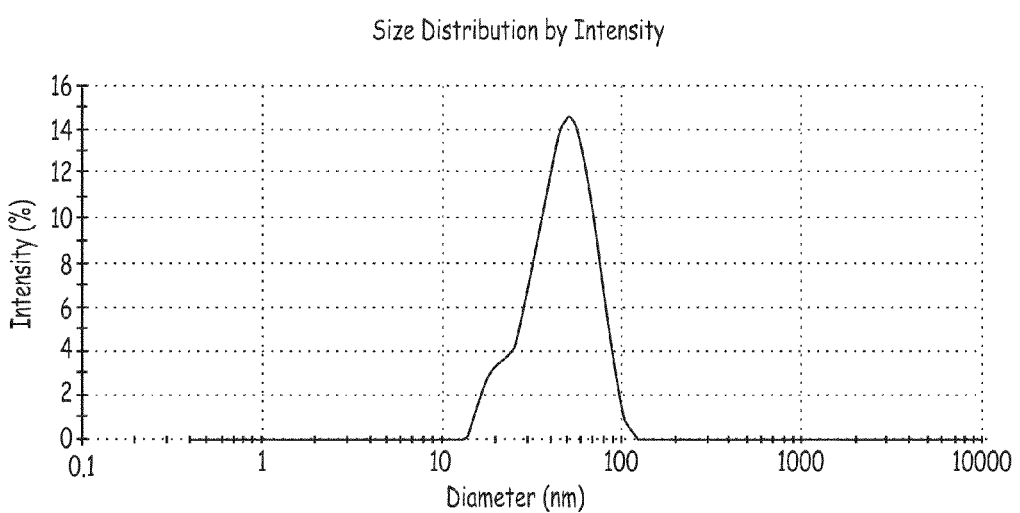
FIG. 13 is a dynamic light scattering plot of the particle of the dispersion of FIG. 12 dispersed in tolulene following surface modification with octadecyl trimethoxy silane.

A 5.6 ml quantity of octadecyl trimethoxy silane was dissolved into 40 ml acetone. The acetone solution was then added gradually to the $TiO_2$-propylene glycol dispersion while shaking and sonicating. The blend of the acetone solution and propylene glycol dispersion was sonicated for two hours at 65° C. During this period, the dispersion became very cloudy with a considerable amount of precipitation. At the end of the sonication period, all of the particles were precipitated with the addition of more acetone. The precipitate was washed with acetone once. The washed precipitate was re-dispersed in 110 ml of toluene and sonicated for 0.5 hr. The secondary particle size of $TiO_2$ in the toluene dispersion was determined by dynamic light scattering, and the measured particle size distribution is shown in FIG. 13. The z-average of the particle size distribution is approximately equal to the z-average of the particle size distribution prior to surface modification.

Figure 14:
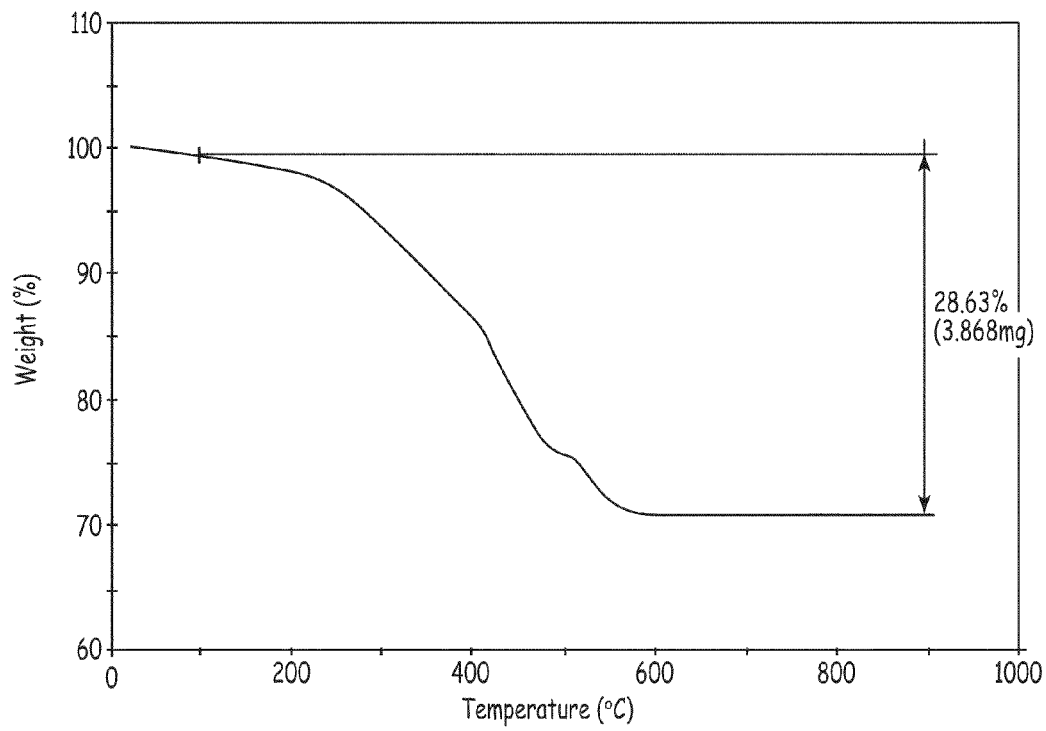
FIG. 14 is a plot of a thermogravametric analysis of the surface modified particles dispersed in FIG. 13.
Figure 15:
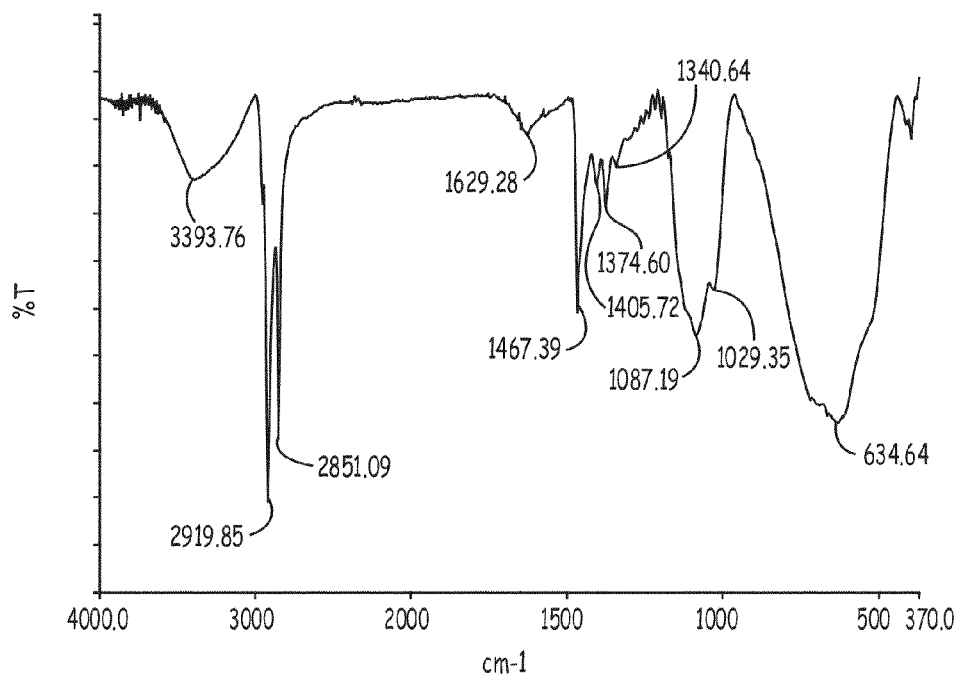
FIG. 15 is a Fourier transform infrared spectrum of the surface modified particles of the dispersion of FIG. 13.
Figure 16:
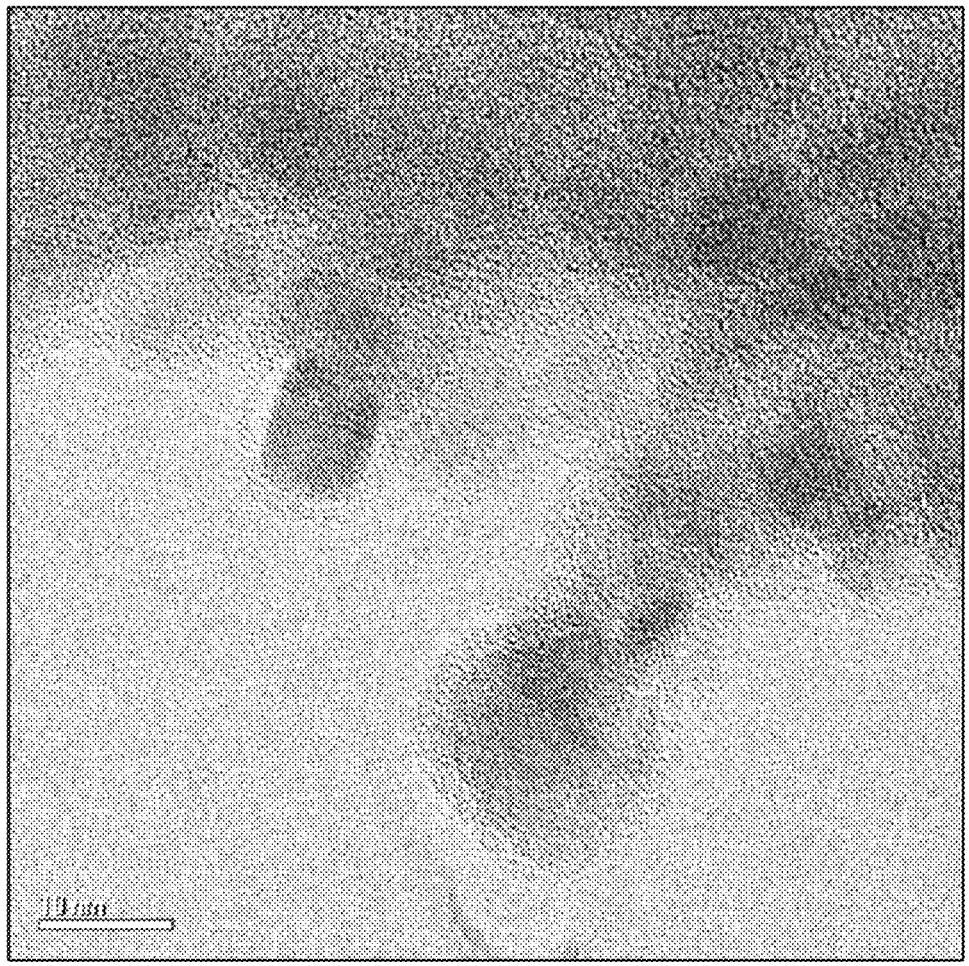
FIG. 16 is a transmission electron micrograph of the surface modified particles of the dispersion of FIG. 13.

The degree of coverage of the surface modification compound was determined through thermogravimetry analysis (TGA) using an instrument from TA Instruments (New Castle, Del.). In this technique, the weight is traced as a function of temperature. As the temperature increases, volatile or combustible constituents are lost so that the weight correspondingly decreases. The TGA plot for the octadecyl silane modified particles is shown in FIG. 14. A weight loss of 28.6% at a temperature of 900° C. indicates that the particles were surface modified. The surface modified particles were also analyzed using Fourier transform infrared (FTIR) spectroscopy. The FTIR spectrum, shown in FIG. 15, has peaks at 2851 $cm^{-1}$ and 2919 $cm^{-1}$ corresponding with $-CH_2$ vibrations, 1087 $cm^{-1}$ corresponding with Si—O vibrations and 634 corresponding with $TiO_2$ vibrations, which provides further evidence of the surface modification. Referring to FIG. 16, transmission electron micrographs of the surface modified particles have a visible layer of organic coating.

Figure 17:
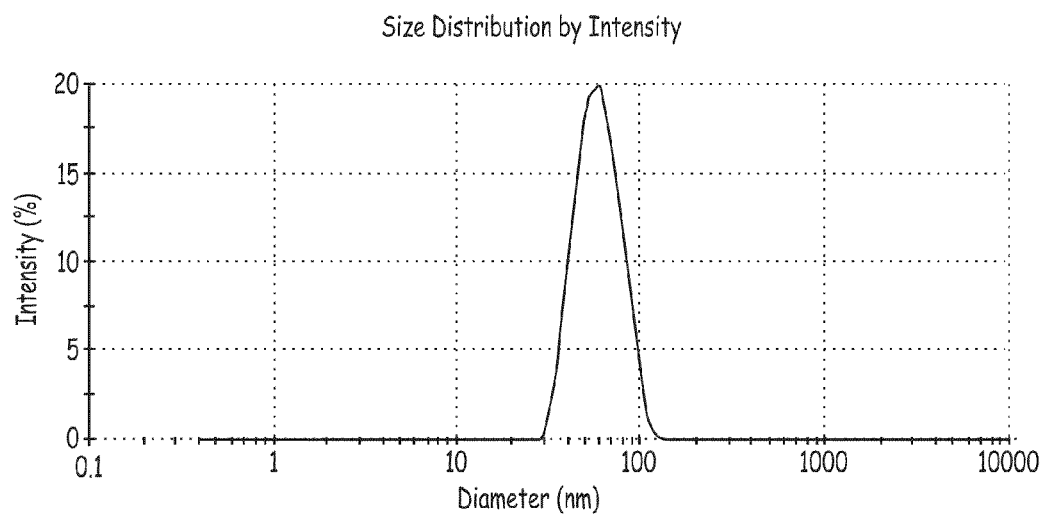
FIG. 17 is a dynamic light scattering plot of another embodiment of a dispersion of titanium oxide particles in methanol.

In another representative example, the particles were surface modified with methacryloxy propyl trimethoxy silane ($CH_2$=CHCOO($CH_2$)$_3$Si(OCH$_3$)$_3$) (Z-6030® from Dow-Corning) to form a 4 weight percent dispersion in methanol. The $TiO_2$ particles had BET surface area of 185 $m^2$/g. Initially, a 0.25 g quantity of $TiO_2$ particles were dispersed in 50 ml of methanol to form a 0.5 weight percent dispersion. This dispersion was sonicated for 2 hr. The sonicated dispersion was then centrifuged at 3500 rpm for 5 minutes, and the precipitate was removed. The secondary particle size distribution of this sample was measured using dynamic light scattering, and the results are plotted in FIG. 17.

To perform the surface modification, a 0.140 ml quantity of Z-6030® silane was added to the dispersion, sufficient for a monolayer of coverage, and the mixture was sonicated for 2 hr at 65° C. Methanol was evaporated off with a rotary-evaporator until there was 5 ml of dispersion left to have a concentration of 4 to 5 weight percent. The solution was stable and had a bluish color.

Figure 18:
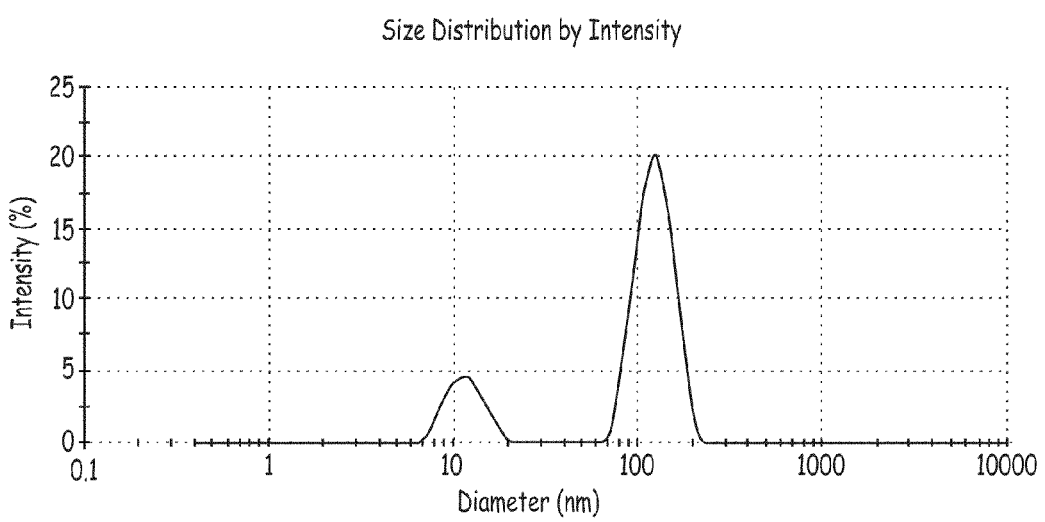
FIG. 18 is a dynamic light scattering plot of the particle of the dispersion of FIG. 17 dispersed in methanol following surface modification with methacyloxy propyl trimethoxy silane.
Figure 19:
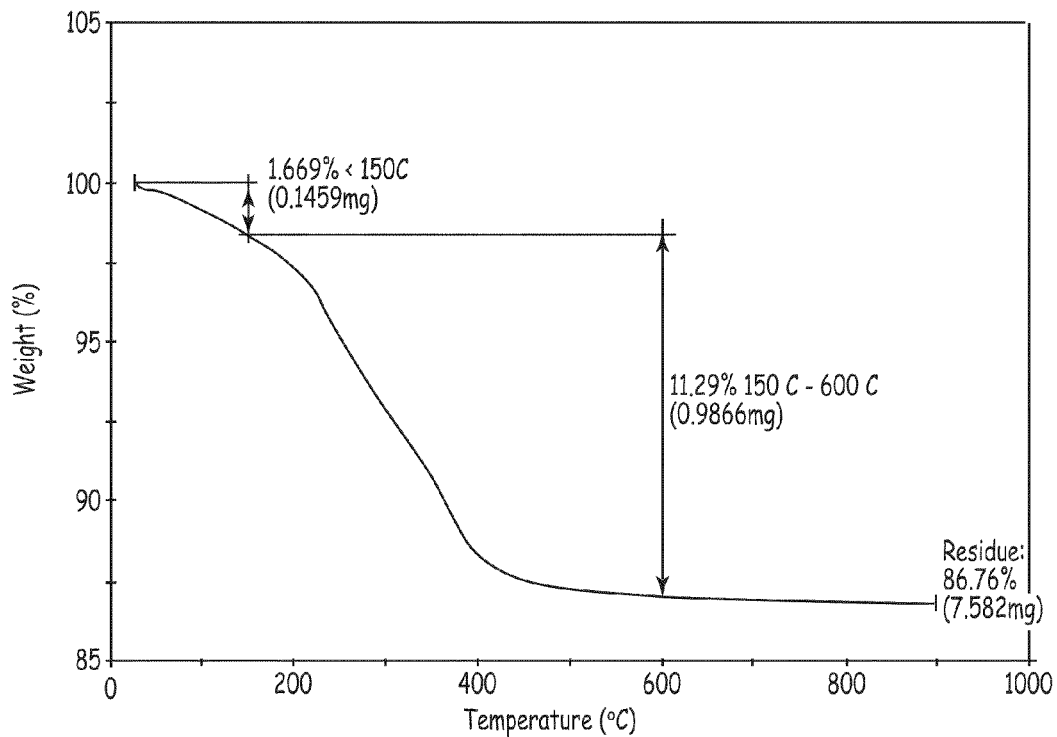
FIG. 19 is a plot of a thermogravametric analysis of the surface modified particles dispersed in FIG. 18.
Figure 20:
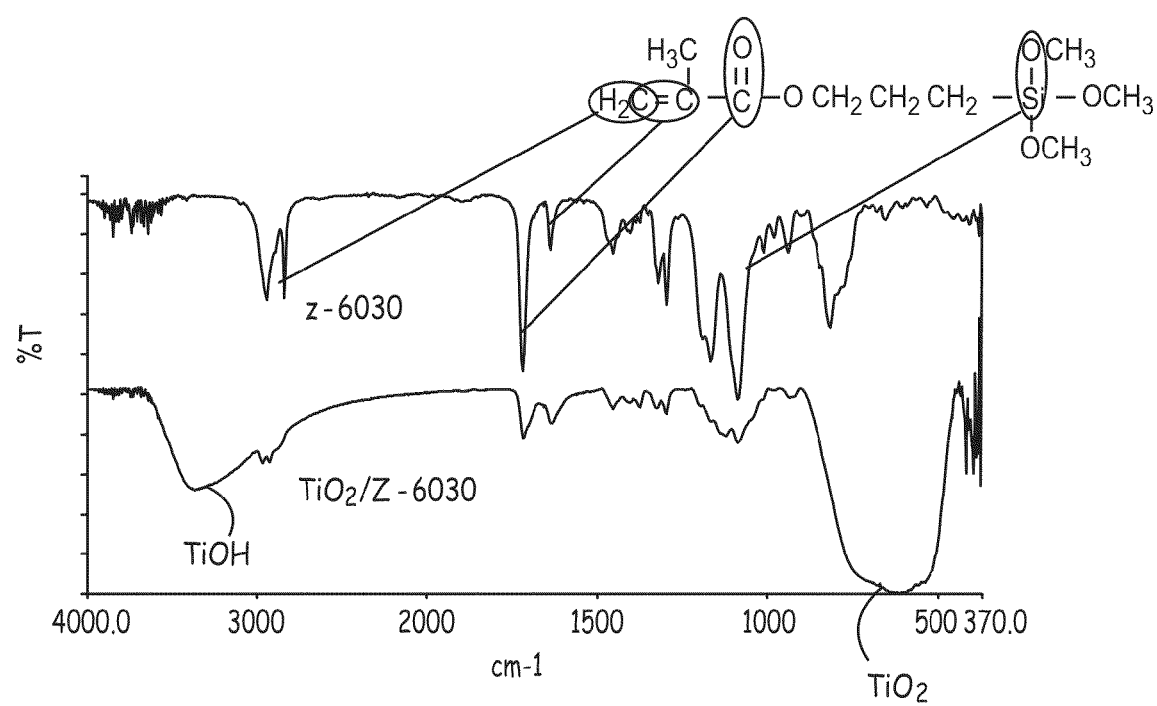
FIG. 20 is a Fourier transform infrared spectrum of the surface modified particles of the dispersion of FIG. 18.

The secondary particle size of the surface modified particles was measured with dynamic light scattering, and the resulting particle size distribution is shown in FIG. 18. The particle size distribution of the modified particles has two significant peaks. The smaller peak had a maximum at 11.7 nm, which is close to the primary particle size. The larger peak had a maximum at 123 nm, which was about twice the diameter at the peak for the unmodified particles. The modified particles were further analyzed with TGA and FTIR. The TGA spectrum is shown in FIG. 19. An initial drop in weight can be attributed to the loss of solvents and adsorbed substances and a more significant drop can be attributed to silane decomposition, with the weight leveling off at the $TiO_2$ residue weight. Referring to FIG. 20, the infrared spectrum of the surface modified particles is compared with the spectrum of the silane so that the spectrum provides confirming evidence of surface modification by the silane.

In a representative third version, surface modification was performed with poly-dimethoxysiloxane. Each monomer unit of the polymer has two methoxy groups that can undergo reaction with the particle surface. Due to the polymeric nature of the surface modifier, the polymer molecule can be expected to wrap around the particle to form a highly functionalized shell. The particles can be pre-reacted with water to increase reactivity, which has been found to have a synergistic effect with the highly functionalized particle surface. The polymer modified particles are capped by reacting the particles with hexamethyldisilazane, which hydrolizes into two trimethyl silanols that react with surface —OH groups.

A water pretreatment was performed by dispersing 100 mg of $TiO_2$ powder in 2 ml water and sonicating the blend for 0.5 hr at 60° C. After sonication, 2 ml of acetone was added, and the dispersion was centrifuged at 6000 rpm for 5 minutes. The supernatant was discarded, and the precipitate was further processed.

The pre-treated $TiO_2$ was redispersed in 20 ml of methanol to make a 0.5 weight percent dispersion. This dispersion was sonicated for 2 hr at room temperature. After sonication, the dispersion was centrifuged at 4000 rpm for 5 minutes. The precipitate with a small amount of carbon particles and large $TiO_2$ particles was discarded. Then, 0.025 g of poly-dimethoxysiloxane (Gelest, Inc.) was added to the supernatant. Then, this mixture was sonicated at 60° C. for 2 hr.

Figure 21:
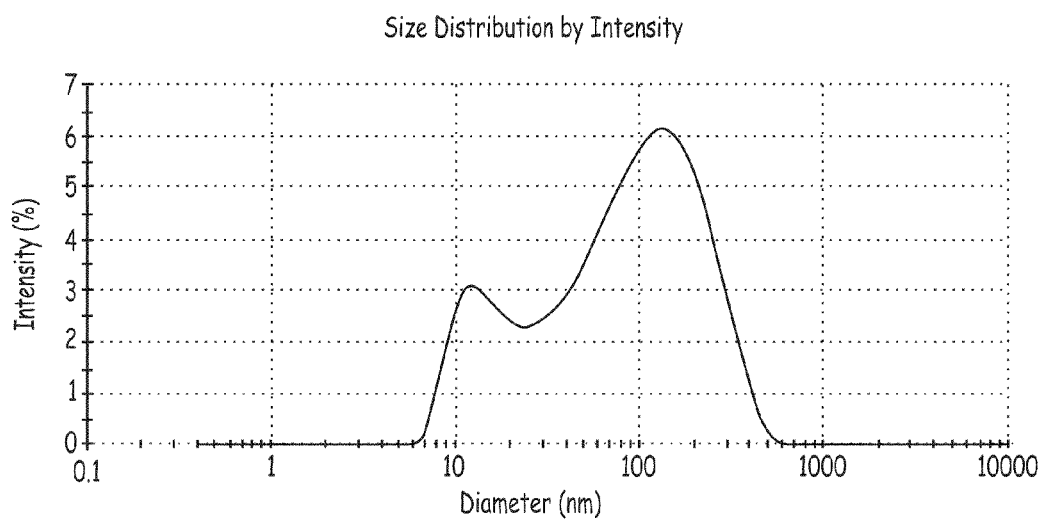
FIG. 21 is a dynamic light scattering plot of titanium oxide particles dispersed in methyl ethyl ketone following surface modification with hexamethyl disilazane.
Figure 22:
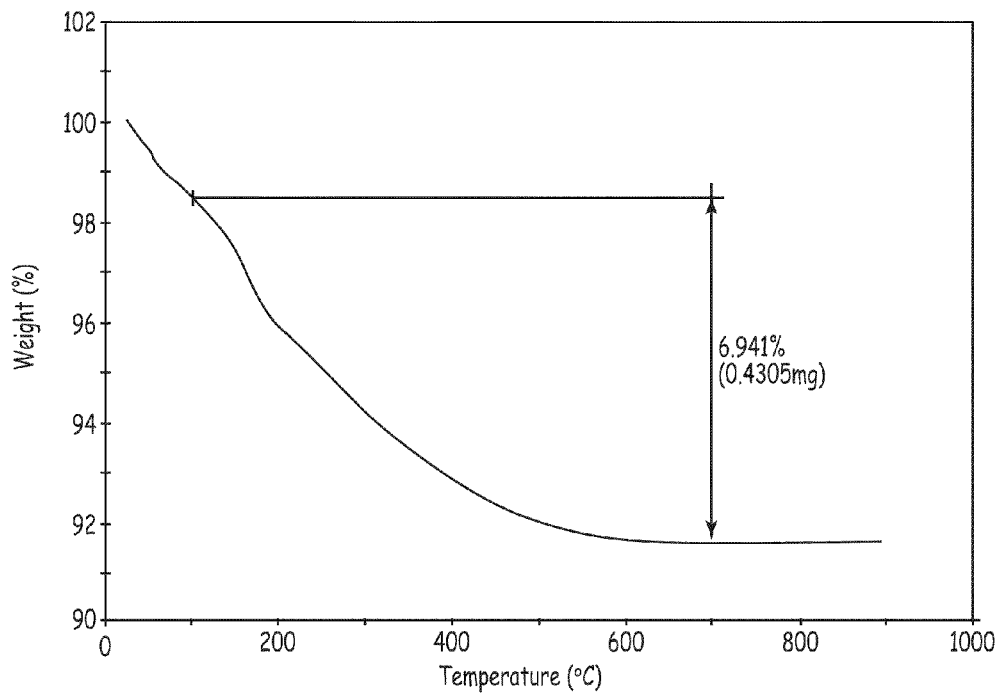
FIG. 22 is a plot of a thermogravametric analysis of the surface modified particles dispersed in FIG. 21.

A 0.5 ml quantity of hexamethyldisilazane (($CH_3$)$_3$SiNHSi ($CH_3$)$_3$) (Sigma-Aldrich) was dissolved in 10 ml of methyl ethyl ketone to form a capping solution. The capping solution was added drop-wise to the dispersion in methanol. The resulting mixture was sonicated for 2 hr at 60° C. After sonication was complete, 10 ml of acetone was added to precipitate the modified particles. After the addition of acetone, the mixture was centrifuged at 6000 rpm for 0.5 hr to settle the particles. The particles were decanted from the liquid, and the precipitate was re-dispersed in methyl ethyl ketone. The re-dispersed particles were sonicated for 5 to 60 minutes to form a stable 5 weight percent dispersion. The secondary particle size was measured with dynamic light scattering. The resulting particle dispersion is shown in FIG. 21. The distribution had two substantial peaks in which one had a peak maximum at about 14.9 nm and a second at 130.8 nm. A TGA measurement for the surface modified particles is shown in FIG. 22. This plot displays an appropriate shape to correspond with decomposition of the surface modifying silane indicative of appropriately surface modified particles.

Figure 23:
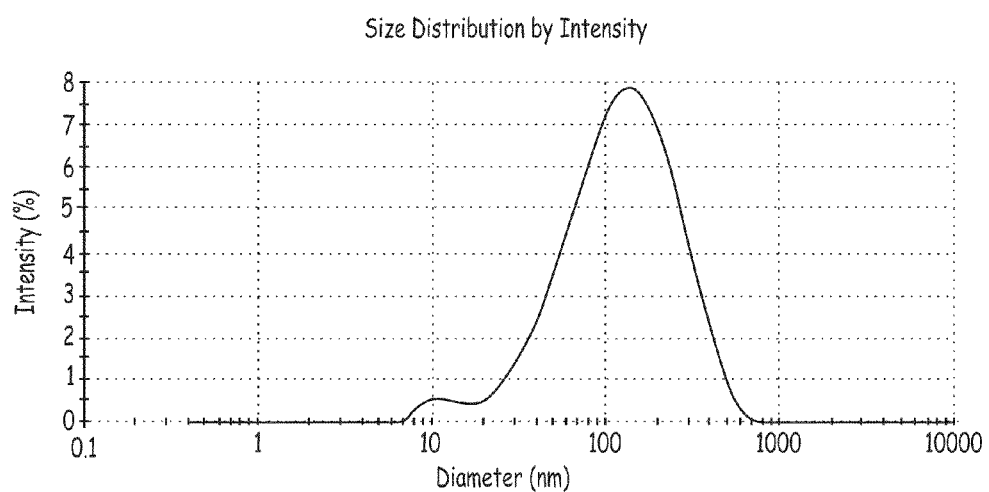
FIG. 23 is a dynamic light scattering plot of titanium oxide particles dispersed in methyl ethyl ketone following surface modification with allyl trimethoxy silane.
Figure 24:
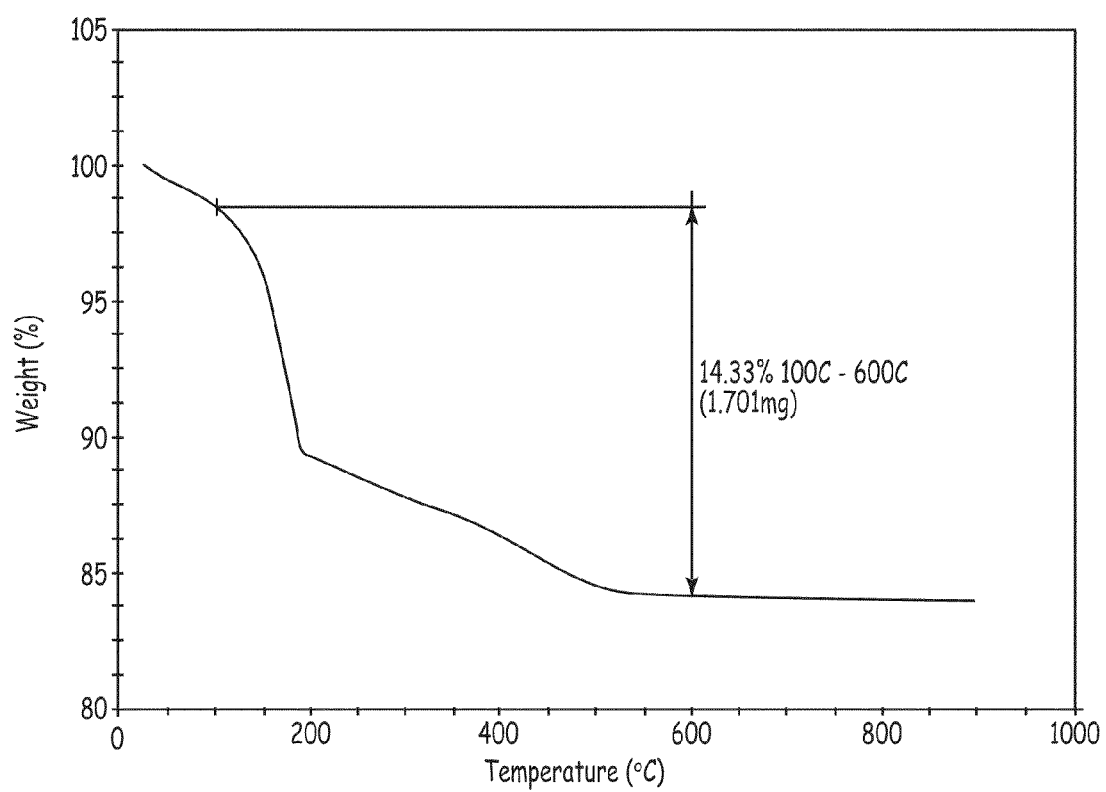
FIG. 24 is a plot of a thermogravametric analysis of the surface modified particles dispersed in FIG. 23.

In a fourth representative surface modification, the $TiO_2$ particles were not well dispersed prior to performing the surface modification. The surface modification was performed with allyl trimethoxy silane, $CH_2$=$CH_2$Si(OCH$_3$)$_3$. A 0.5 g quantity of $TiO_2$ powder with a BET surface area of 151.8 $m^2$/g was dispersed in 12.5 ml methyl ethyl ketone to form a 5 weight percent dispersion. This dispersion was sonicated with a probe sonicator, which is more effective than a bath sonicator, but the particles were not stably dispersed. A 0.23 ml quantity of allyl trimethoxy silane was added and sonication was continued for 30 min. The particles dispersed into a very stable dispersion. The particle size was measured with dynamic light scattering. The particle size distribution is plotted in FIG. 23. A small peak is observed with a maximum at 11.6 nm, but most of the particles were found associated with a peak at a diameter of 152.6 nm, which is larger than secondary particle sizes observed for modified particles in which the particles were well dispersed prior to surface modification. The TGA results are shown in FIG. 24. The TGA plot has weight loss corresponding with decomposition of the silane.

Example 4

Polymer-Titania Particle Composites

This example demonstrates the ability to form highly transparent composite films with a high index of refraction.

The composite is formed with a copolymer of methyl methacrylate and methacrylic acid. The copolymer from Polyscience Inc. (catalogue number 08208) had a monomer ratio of methyl methacrylate to methacrylic acid of 3:1 and an average molecular weight of about 1.2 million Daltons. The copolymer was dissolved at a 5 weight percent solids into a solvent blend of isopropyl alcohol and water at a volume ratio of 9:1. A particle dispersion at about 4 weight percent of $TiO_2$ modified with metharyloxy propyl trimethoxy silane (Z-6030®) was prepared as described in Example 3.

The particle dispersion was added slowly to the polymer solution with swirling to avoid precipitation. If the polymer solution is added to the particle dispersion, precipitation is observed under comparable slow addition with swirling. Once the particle dispersion is completely added to the polymer solution, the resulting composite slurry was sonicated for 1.5 to 2.0 hrs at room temperature. After sonication, the composite slurries were concentrated. Specifically, the methanol in the slurry was evaporated with a rotary evaporator. As the methanol is removed, the viscosity increases, and the solvent removal can be stopped once a desired viscosity is reached for further processing. Following solvent removal, the composite slurry was filtered with a 2.7 micron Whatman® filter to remove any agglomerates. In general, composites with well dispersed particles were formed with particle loadings up to 75 weight percent.

Figure 25:
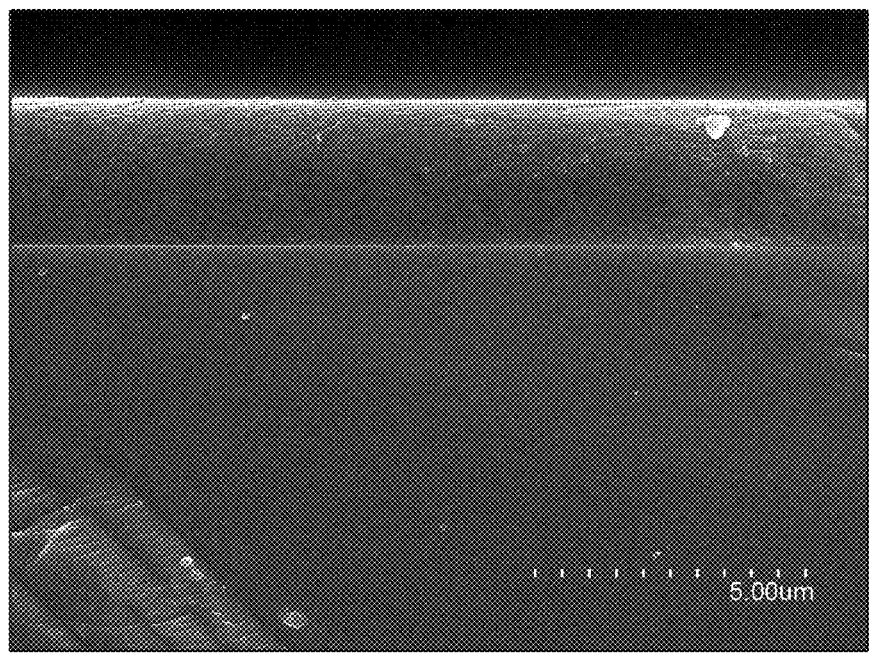
FIG. 25 is a scanning electron micrograph of a cross section of a composite film formed with titanium oxide particles surface modified with metharyloxy propyl trimethoxy silane in an acrylate copolymer.
Figure 26:
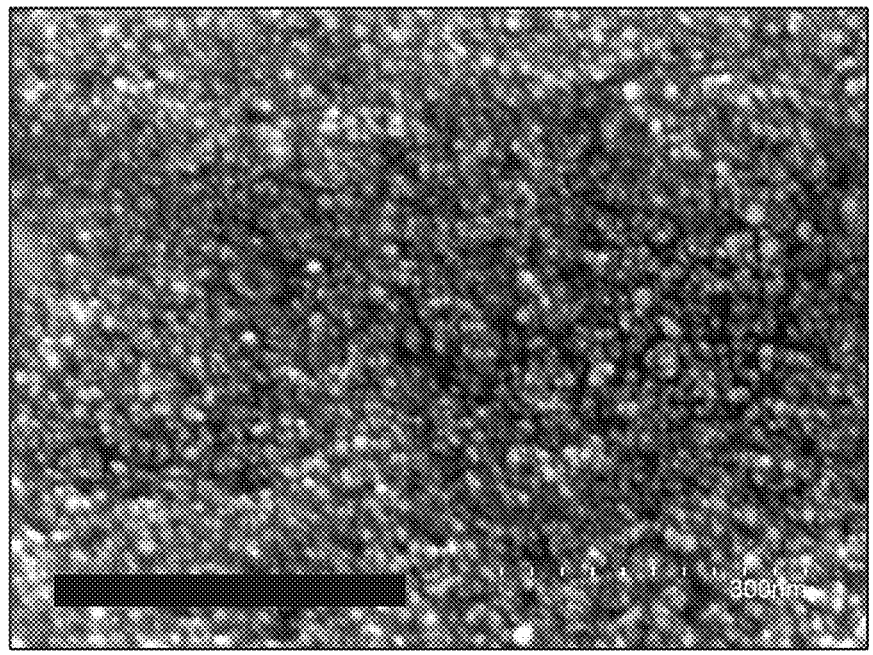
FIG. 26 is a scanning electron micrograph of the surface of the film in FIG. 25.

Films were spin coated onto a silicon wafer for thickness and refractive index measurements and onto a glass slide for transmittance measurements. Based on the selection of the viscosity, film thickness values were obtained from 1 micron to 5 microns using a WS-400B-NPP-Lite spin coater from Laurell Technologies Corp., North Wales, Pa. The spin coatings were formed in two steps. A first step was performed at 50 rpm for 10 seconds, and a second step involved spinning at 1500 rpm for three minutes. The film thickness and refractive index was evaluated with a FilmTek™ 4000 instrument from Scientific Computing International, Carlsbad, Calif. The film morphology was examined with a JSM-6330F Scanning Electron Microscope (Joel, Ltd., Tokyo, Japan). A scanning electron microscope (SEM) image is shown in FIG. 25 of a cross section of a film with a thickness of about 2.5 microns, or a particle loading of 50 weight percent, and a reflective index of 1.7 index units on a silicon substrate. A SEM image of the surface of the same film is shown in FIG. 26. The images show the particles uniformly distributed within the film.

Figure 27:
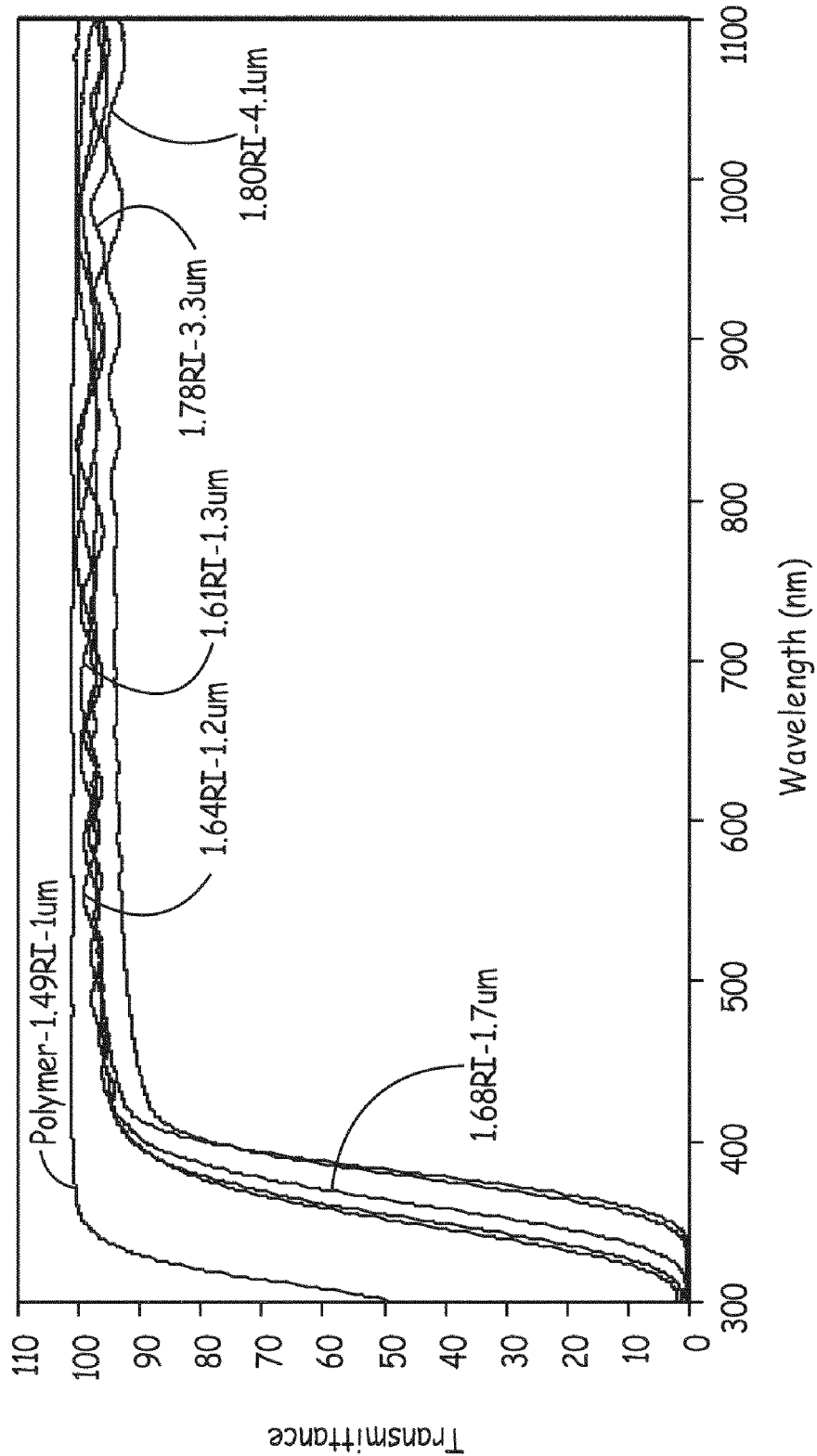
FIG. 27 is a plot of transmittance measurements for the film in FIG. 25.

Transmittances of the films were evaluated with a SINCO UV-Visible spectrometer. The results for 6 film samples are shown in FIG. 27. The transmittance was measured with the glass substrate as a reference. The refractive index values ranged from 1.49 to 1.80 index units, which corresponded with particle loadings from 0 to 75. The films had a thickness from 1 micron to 4.1 microns. All of these films had a transmittance greater than 90 percent.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What we claim is:

1. A composite comprising a polymer and surface modified metal oxide particles at a loading of at least 5 weight percent of the composite, wherein the metal oxide particles have a number average primary particle diameter less than about 20 nanometers and a z-average secondary particle size of no more than about 100 nanometers, wherein the surface modification comprises a plurality of bonded molecules along the surface of the particles and wherein the composite formed into a film with a thickness of 5 microns on a transparent substrate has a transmittance at one visible wavelength of at least about 90% relative to the transmittance of the substrate without the composite coating, and wherein the z-average secondary particle size is no more than a factor of four times the average primary particle diameter.

2. The composite of claim 1 wherein the composite comprises at least about 20 weight percent metal oxide particles.

3. The composite of claim 1 wherein the composite comprises at least about 40 weight percent metal oxide particles.

4. The composite of claim 1 wherein the average primary particle diameter is no more than about 15 nanometers.

5. The composite of claim 1 wherein the z-average secondary particle size is no more than about 60 nanometers.

6. The composite of claim 1 wherein the z-average secondary particle size is no more than about 50 nanometers.

7. The composite of claim 1 wherein the transmittance at one visible wavelength is at least about 93%.

8. The composite of claim 1 wherein the polymer comprises an acrylate.

9. The composite of claim 1 wherein the surface modifier comprises a silane chemically bonded to the particle surface.

10. The composite of claim 1 wherein the surface modifier comprises a functional group chemically bonded to polymer.

11. The composite of claim 1 wherein the polymer comprises polysiloxane.

12. The composite of claim 1 wherein the polymer comprises a block copolymer.

13. The composite of claim 1 wherein the z-average secondary particle size is no more than a factor of three times the average primary particle size.

14. The composite of claim 1 wherein the metal oxide particles comprise titania.

15. The composite of claim 14 wherein the composite comprises at least about 40 weight percent metal oxide particles.

16. The composite of claim 1 wherein the metal oxide particles comprise a phosphor.

17. The composite of claim 1 wherein the composite has an index-of-refraction of at least about 2 across the visible spectrum.

18. The composite of claim 1 wherein the metal oxide particles have a distribution in diameters such that at least about 95 percent of the particles have a diameter greater than about 40 percent of the average primary particle diameter and less than about 160 percent of the average primary particle diameter.

19. The composite of claim 1 wherein essentially no particles have an average diameter greater than about 5 times the average primary particle diameter.

20. The composite of claim 1 wherein essentially all of the secondary particles can have a size no more than 4 times the z-average secondary particle size.

* * * * *